(12) United States Patent
Tanigawa

(10) Patent No.: US 7,649,567 B2
(45) Date of Patent: Jan. 19, 2010

(54) FORMAT CONVERSION APPARATUS, FORMAT CONVERSION METHOD, AND IMAGE DISPLAY APPARATUS AND IMAGE DISPLAY METHOD USING THE FORMAT CONVERSION APPARATUS

(75) Inventor: Satoru Tanigawa, Kawanishi (JP)

(73) Assignee: Panasonic Corporation, Osaka (JP)

( * ) Notice: Subject to any disclaimer, the term of this patent is extended or adjusted under 35 U.S.C. 154(b) by 820 days.

(21) Appl. No.: 11/289,598

(22) Filed: Nov. 30, 2005

(65) Prior Publication Data

US 2006/0114351 A1   Jun. 1, 2006

(30) Foreign Application Priority Data

Nov. 30, 2004   (JP) ............................. 2004-347011

(51) Int. Cl.
*H04N 7/01* (2006.01)
*H04N 1/393* (2006.01)

(52) U.S. Cl. ..................... 348/441; 348/445; 348/581; 348/556; 382/298; 345/670; 345/472.1

(58) Field of Classification Search ................. 348/458, 348/445, 441, 556, 581, 704; 382/298, 299; 345/660, 670, 472, 472.1
See application file for complete search history.

(56) References Cited

U.S. PATENT DOCUMENTS 5,796,442 A     8/1998 Gove et al.
2006/0077213 A1*  4/2006 Li ............................. 345/660

FOREIGN PATENT DOCUMENTS

JP        2002-271811      9/2002

* cited by examiner

*Primary Examiner*—M. Lee
*Assistant Examiner*—Jean W Désir
(74) *Attorney, Agent, or Firm*—Wenderoth, Lind & Ponack, L.L.P.

(57) ABSTRACT

A format conversion apparatus for subjecting data having a predetermined resolution to conversion of the resolution according to a resolution of a display screen, comprises: a timing generation unit for generating a timing for thinning out inputted signal data, using a resolution conversion coefficient that is calculated on the basis of a conversion ratio of the resolution; and a selection unit for selecting, from two pieces of input signal data existing before and after the timing generated by the timing generation unit, the signal data that is timewise closer to the timing; wherein resolution conversions in the horizontal direction and the vertical direction are carried out while maintaining the combination of the inputted signals.

14 Claims, 19 Drawing Sheets

FORMAT CONVERSION APPARATUS, FORMAT CONVERSION METHOD, AND IMAGE DISPLAY APPARATUS AND IMAGE DISPLAY METHOD USING THE FORMAT CONVERSION APPARATUS

FIELD OF THE INVENTION

The present invention relates to a format conversion apparatus and a format conversion method for subjecting data having predetermined resolution to resolution conversion according to resolution of a display screen. The invention also relates to an image display apparatus and an image display method using the format conversion apparatus.

BACKGROUND OF THE INVENTION

In recent years, image display apparatuses, such as a television receiver, a liquid crystal display, and a plasma display, have different resolutions of image display, and various resolutions have come in. In these image display apparatuses, it is necessary to convert resolutions of signal data, such as a graphics signal independent of a video signal, on-screen data (hereinafter referred to as OSD) for displaying a channel number, volume and the like on a screen, text information multiplexed in a blanking period or the like of a received broadcast and transmitted, and data broadcast information, and to synthesize these signal data with a video signal for display.

A conventional format conversion apparatus performs filtering on a graphics signal to convert resolution of a color component signal, and outputs only the same value of superposition coefficient as that before the resolution conversion (refer to Japanese Published Patent Application No. 2002-271811: Patent Document 1).

Hereinafter, the conventional format conversion apparatus will be described.

FIG. 19 is a block diagram illustrating the outline of the conventional image display apparatus disclosed in Patent Document 1.

With reference to FIG. 19, the conventional image display apparatus comprises a color format converter 1, a resolution converter 2 for a video signal, a color lookup table 3, a resolution converter 11 for a color component signal, a resolution converter 12 for superposition coefficient, and a synthesizer 4. In FIG. 19, the resolution converter 11 for color component signal and the resolution converter 12 for superposition coefficient correspond to the conventional format conversion apparatus.

Hereinafter, a description will be given of the operation of the image display apparatus constructed as described above.

A graphics signal Gindex to be synthesized to an input video signal Vin is supplied in an index format to reduce the amount of data, and color signal components C and superposition coefficients α corresponding to the respective indexes are outputted from the color lookup table 3. The outputted color signal components C are input to the color component signal resolution converter 11, and the superposition coefficients α are input to the superposition coefficient resolution converter 12.

FIG. 20 shows data before and after conversion by the color component signal resolution converter 11 in the conventional format conversion apparatus, wherein the resolution of the color component signal C is converted to ⅔.

With reference to FIG. 20, the color component signal resolution converter 11 converts the inputted color component signals C0, C1, C2, C3, C4, and C5, into C0, (C1+C2)/2, C3, and (C4+C5)/2, whereby the resolutions of the signals are converted. Thereafter, the color component signals are synthesized with a video signal by the synthesizer 4 to output an output video signal Vout.

In the conventional format conversion apparatus, however, when converting resolutions of such as a graphics signal and an OSD signal to be displayed, an averaging process comprising, for example, adding adjacent data to each other and then dividing the result by two, is carried out, whereby a color component signal different from an inputted color component signal is undesirably outputted. Therefore, an unexpected color component appears at the boundary of colors or a medium color is undesirably outputted, whereby image blurring or bleeding occurs when the graphics signal and the OSD signal are displayed, leading to inappropriate display of these signals.

On the other hand, it is also possible to change resolution after superposing an OSD signal or the like on a video signal, using the same format conversion apparatus as that for the video signal. However, in a YUV format for video signal processing, the video signal is processed in a ratio of 4:2:2, while a color difference signal is subjected to time-division processing. Therefore, in an RGB signal format 4:4:4 of an OSD signal or the like, it is necessary to thin out UV signals after YUV conversion to half, resulting in degradation of color resolution, which causes degradation of image quality.

Furthermore, since there is no correlation at the boundary between a video signal and an OSD signal, degradation in image quality might occur during operation processing such as filtering. Further, it might be thought that another format conversion apparatus, which is similar to that for video signal processing, is provided for the OSD signal. In this case, however, the circuit scale is undesirably increased.

SUMMARY OF THE INVENTION

The present invention is made to solve the above-mentioned problems and has for its object to provide an apparatus and a method for format conversion, with which image display can be carried out without outputting a medium color or an unexpected color, when converting resolutions of an inputted graphics signal, OSD signal, and text data according to resolution of a display screen.

Simultaneously, it is another object of the present invention to provide an apparatus and a method for image display, with which image display can be carried out using a format conversion apparatus suited to a graphics signal, an OSD signal, and text data.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a 1st aspect of the present invention, there is provided a format conversion apparatus for subjecting data having a predetermined resolution to conversion of the resolution according to a resolution of a display screen, and the apparatus comprises: a timing generation unit for generating a timing for thinning out inputted signal data, using a resolution conversion coefficient that is calculated on the basis of a conversion ratio of the resolution; and a selection unit for selecting, from two pieces of input signal data existing before and after the thinning-out timing generated by the timing generation unit, the signal data that is timewise closer to the thinning-out timing. Therefore, even when performing resolution conversion according to resolution of a display screen in order to carry out channel display, menu display, and display of text information multiplexed in a blanking period, which are called "on-screen display", the resolution conversion can be carried out without outputting medium colors or unexpected colors, thereby preventing degradations in on-screen display and character display. Further, according to the present invention, inputted RGB signals can be processed while maintaining the format thereof at 4:4:4, whereby conversion can be carried out without degrading color resolution.

According to a 2nd aspect of the present invention, in the format conversion apparatus according to the 1st aspect, the timing generation unit comprises: a counter unit for cumulatively counting the resolution conversion coefficient for every sampling clock of the input signal, with a first threshold value as a limit, and when the count value overflows, the counter unit setting a value obtained by removing a carryout signal from the count value, as a count value for the next sampling clock; and a timing of the sampling clock at which the count value of the counter unit becomes equal to or larger than the first threshold value is outputted as a thinning-out timing for thinning out the inputted signal data.

According to a 3rd aspect of the present invention, in the format conversion apparatus according to the 2nd aspect, the selection unit comprises: a threshold judgment unit for comparing the count value of the counter unit with a second threshold value; a delay unit for delaying the input signal by an interval of pixels that are adjacent to each other in the horizontal direction; and a switch unit for selecting either the input signal or the signal delayed by the delay unit, on the basis of the result of judgment by the threshold judgment unit.

According to a 4th aspect of the present invention, in the format conversion apparatus according to the 2nd aspect, the selection unit comprises: a threshold judgment unit for comparing the count value of the counter unit with a second threshold value; a delay unit for delaying the input signal by an interval of lines that are adjacent to each other in the vertical direction; and a switch unit for selecting either the input signal or the signal delayed by the delay unit, on the basis of the result of judgment by the threshold judgment unit.

According to a 5th aspect of the present invention, the format conversion apparatus according to the 1st aspect further includes a singular point detection unit for detecting a singular point of the input signal data, at which a difference between the input signal data and signal data nearest to the input signal data is equal to or larger than a third threshold value; and the selection unit selects the signal data at the singular point, when either of the two pieces of input signal data existing before and after the timing generated by the timing generation unit corresponds to the singular point of the input signal data. Therefore, when converting an input signal so as to have the number of data less than the number of data inputted by resolution conversion, the resolution conversion can be carried out while avoiding that missing of data occurs only at a singular point, i.e., a point having no correlation with previous and subsequent data, thereby preventing degradations in on-screen display and character display.

According to a 6th aspect of the present invention, in the format conversion apparatus according to the 5th aspect, the singular point detection unit comprises: a delay unit for delaying an input signal by an interval of pixels that are adjacent to each other in the horizontal direction; a difference detection unit for detecting a difference between the input signal and the signal delayed by the delay unit; and a detection unit for detecting the input signal data as a singular point of input signal data when the result of detection by the difference detection unit is equal to or larger than the third threshold value.

According to a 7th aspect of the present invention, in the format conversion apparatus according to the 5th aspect, the singular point detection unit comprises: a delay unit for delaying the input signal by an interval of lines that are adjacent to each other in the vertical direction; a difference detection unit for detecting a difference between the input signal and the signal delayed by the delay unit; and a detection unit for detecting the input signal data as a singular point of the input signal data when the result of detection by the difference detection unit is equal to or larger than the third threshold value.

According to an 8th aspect of the present invention, the format conversion apparatus according to the 1st aspect further includes a register for holding the resolution conversion coefficient that is set on the basis of the resolution of the display screen; and the timing generation unit generates a thinning-out timing for thinning out the input signal data, using the resolution conversion coefficient stored in the register.

According to a 9th aspect of the present invention, there is provided a format conversion apparatus for subjecting data having a predetermined resolution to conversion of the resolution according to a resolution of a display screen, and the apparatus comprises: a horizontal direction timing generation unit for generating a horizontal direction thinning-out timing for thinning out input signal data using a resolution conversion coefficient that is calculated on the basis of a conversion ratio of resolution in the horizontal direction; a horizontal direction selection unit for selecting, from two pieces of pixel data existing before and after the horizontal thinning-out timing generated by the horizontal direction timing generation unit, the pixel data that is timewise closer to the horizontal thinning-out timing; a vertical direction timing generation unit for generating a vertical direction thinning-out timing for thinning out input signal data using a resolution conversion coefficient that is calculated on the basis of a conversion ratio of resolution in the vertical direction; and a vertical direction selection unit for selecting, from two pieces of line data existing before and after the vertical thinning-out timing generated by the vertical direction timing generation unit, the line data that is timewise closer to the vertical thinning-out timing.

According to a 10th aspect of the present invention, the format conversion apparatus according to the 1st aspect further includes a synthesizer unit for synthesizing a main video signal and the signal which has been subjected to the format conversion of data having a predetermined resolution by the format conversion apparatus.

According to an 11th aspect of the present invention, there is provided a format conversion method for subjecting data having a predetermined resolution to conversion of the resolution according to a resolution of a display screen, and the method comprises: a timing generation step of generating a timing for thinning out inputted signal data, using a resolution conversion coefficient that is calculated on the basis of a conversion ratio of the resolution; and a selection step of selecting, from two pieces of input signal data existing before and after the thinning-out timing generated by the timing generation unit, the signal data that is timewise closer to the thinning-out timing.

According to a 12th aspect of the present invention, in the format conversion method according to the 11th aspect, the timing generation step comprises: performing a counting process of cumulatively counting the resolution conversion coefficient for every sampling clock of the input signal, with a first threshold value as a limit, and setting a value obtained by removing a carryout signal from the count value as a count value for the next sampling clock, when the count value overflows; and outputting a timing of the sampling clock at which the count value of the counter unit becomes equal to or larger than the first threshold value, as a thinning-out timing for thinning out the inputted signal data.

According to a 13th aspect of the present invention, in the format conversion method according to the 12th aspect, the selection step comprises: a threshold judgment step of comparing the count value with a second threshold value; a delaying step of delaying the input signal by an interval of pixels that are adjacent to each other in the horizontal direction; and a switching step of selecting either the input signal or the signal delayed in the delaying step, on the basis of the result of judgment in the threshold judgment step.

According to a 14th aspect of the present invention, in the format conversion method according to the 12th aspect, the selection step comprises: a threshold judgment step of comparing the count value with a second threshold value; a delaying step of delaying the input signal by an interval of lines that are adjacent to each other in the vertical direction; and a switching step of selecting either the input signal or the signal delayed in the delaying step, on the basis of the result of judgment in the threshold judgment step.

According to a 15th aspect of the present invention, the format conversion method according to the 11th aspect further includes a singular point detection step of detecting a singular point of the input signal data, at which a difference between the input signal data and signal data nearest to the input signal data is equal to or larger than a third threshold value; and the selection step selects the signal data at the singular point, when either of the two pieces of input signal data existing before and after the timing generated in the timing generation step corresponds to the singular point of the input signal data.

According to a 16th aspect of the present invention, in the format conversion method according to the 15th aspect, the singular point detection step comprises: a delaying step of delaying an input signal by an interval of pixels that are adjacent to each other in the horizontal direction; a difference detection step of detecting a difference between the input signal and the signal delayed in the delaying step; and a detection step of detecting the input signal data as a singular point of input signal data when the result of detection in the difference detection step is equal to or larger than the third threshold value.

According to a 17th aspect of the present invention, in the format conversion method according to the 15th aspect, the singular point detection step comprises: a delaying step of delaying the input signal by an interval of lines that are adjacent to each other in the vertical direction; a difference detection step of detecting a difference between the input signal and the signal delayed in the delaying step; and a detection step of detecting the input signal data as a singular point of the input signal data when the result of detection in the difference detection step is equal to or larger than the third threshold value.

According to an 18th aspect of the present invention, there is provided a format conversion method for subjecting data having a predetermined resolution to conversion of the resolution according to a resolution of a display screen, and the method comprises: a horizontal direction timing generation step of generating a horizontal direction thinning-out timing for thinning out input signal data using a resolution conversion coefficient that is calculated on the basis of a conversion ratio of resolution in the horizontal direction; a horizontal direction selection step of selecting, from two pieces of pixel data existing before and after the horizontal thinning-out timing generated in the horizontal direction timing generation step, the pixel data that is timewise closer to the horizontal thinning-out timing; a vertical direction timing generation step of generating a vertical direction thinning-out timing for thinning out input signal data using a resolution conversion coefficient that is calculated on the basis of a conversion ratio of resolution in the vertical direction; and a vertical direction selection step of selecting, from two pieces of line data existing before and after the vertical thinning-out timing generated in the vertical direction timing generation step, the line data that is timewise closer to the vertical thinning-out timing.

According to a 19th aspect of the present invention, an image display method comprises: subjecting data having a predetermined resolution to format conversion using a format conversion method according to the 11th aspect; and synthesizing the format-converted signal and a main video signal to display a synthesis signal on a screen. Since a main video signal, and a signal obtained by format-converting data having a predetermined resolution, such as an OSD signal, are separately subjected to format conversion, degradation in image quality at a boundary can be avoided.

DETAILED DESCRIPTION OF THE PREFERRED EMBODIMENTS

Embodiment 1

Figure 1:
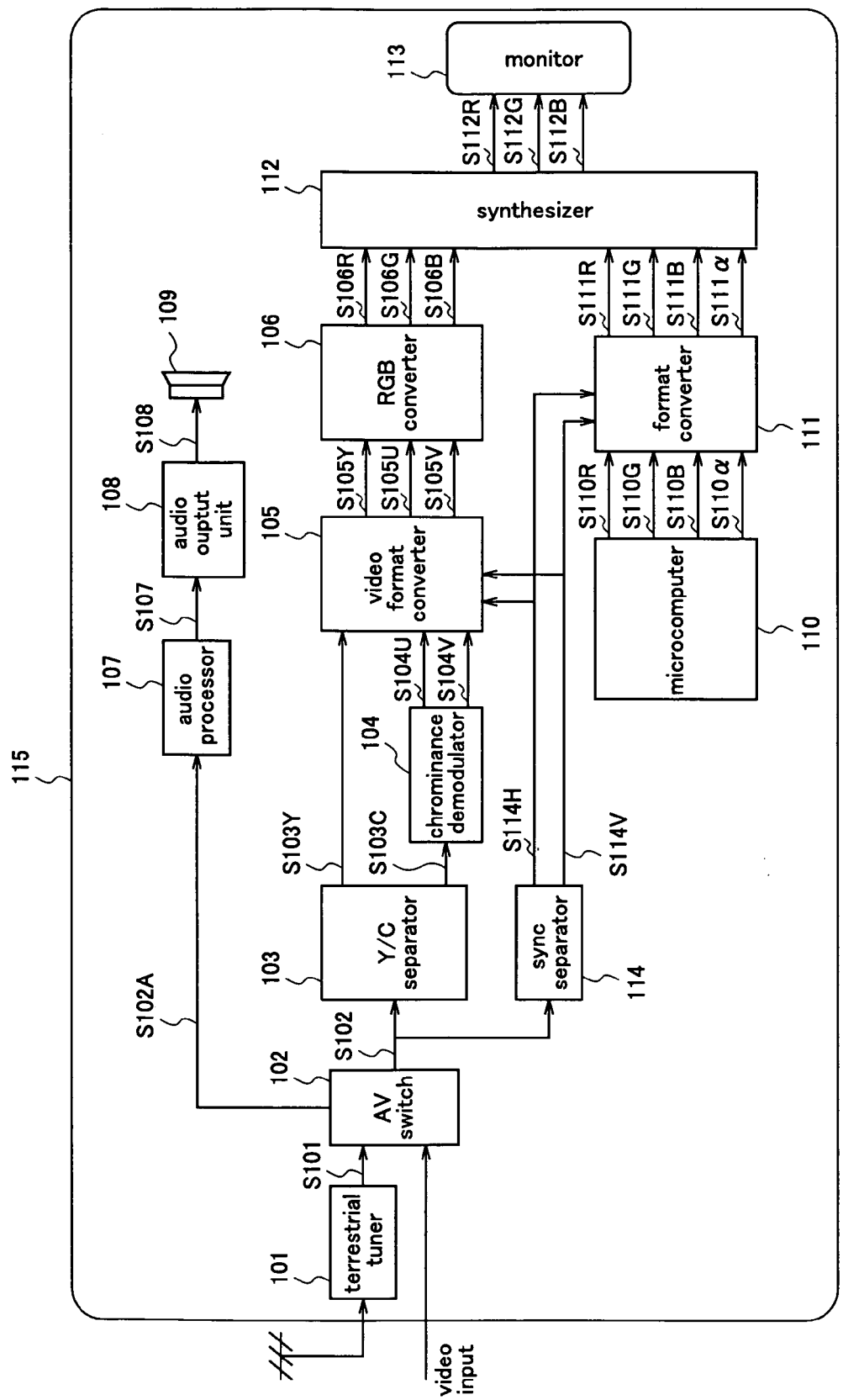
FIG. 1 is a block diagram illustrating the whole construction of an image display apparatus according to a first embodiment of the present invention.

FIG. 1 is a block diagram illustrating the whole construction of an image display apparatus according to a first embodiment of the present invention. In this first embodiment, an image display apparatus which receives terrestrial broadcasting will be described as an example.

With reference to FIG. 1, the image display apparatus 115 of the present invention comprises a terrestrial tuner 101, an AV switch 102, a Y/C separator 103, a chrominance demodulator 104, a video format converter 105, an RGB converter 106, an audio processor 107, an audio output unit 108, a speaker 109, a microcomputer 110, a format converter (hereinafter also referred to as a format conversion apparatus) 111, a synthesizer 112 for synthesizing two video signals, a monitor 113, and a sync separator 114.

The terrestrial tuner 101 receives broadcasts which are allocated to respective channels. The AV switch 102 performs switching between a terrestrial broadcast signal S101 received by the tuner 101, and a video signal and an audio signal inputted from an external apparatus such as a video cassette recorder. The Y/C separator 103 separates a composite video signal S102 outputted from the AV switch 102 into a luminance signal S103Y and a chrominance signal S103C. The chrominance demodulator 104 demodulates the chrominance signal S103C outputted from the Y/C separator 103 into a U signal S104U and a V signal S104V which are color-difference signals. The video format converter 105 converts the luminance signal S103Y outputted from the Y/C separator 103 and the U signal S104U and the V signal S104V outputted from the chrominance demodulator 104 into a luminance signal S105Y and color-difference signals S105U and S105V whose resolutions are changed according to the number of pixels of an output monitor, respectively. The RGB converter 106 converts the luminance signal S105Y and the color-difference signals S105U and S105V into a R signal S106R, a G signal S106G, and a B signal S106B, respectively. The sync separator 114 separates a horizontal sync signal S114H and a vertical sync signal S114V from the composite video signal S102, and outputs these signals as sync signals for the video format converter 105 and the format converter 111.

The microcomputer 110 controls an image display unit 115, and outputs an R signal S110R, a G signal S110G, and a B signal S110B for channel display and a menu display which are called on-screen display, and for display of text information multiplexed in a blanking period of the received terrestrial broadcast signal, and a superposition coefficient S110α indicating a superposition ratio with the video signal.

The format converter 111 generates a thinning-out timing for thinning out signal data of an input signal, using a resolution conversion coefficient calculated according to the conversion ratio of resolution, and selects, from two points of input signal data existing before and after the timing, signal data that is timewise closer to the timing, thereby performing resolution conversion according to the number of pixels of the output monitor. The format converter 111 subjects the R signal S110R, G signal S110G, B signal S110B, and the superposition coefficient S110α, which are outputted from the microcomputer 110, to resolution conversion according to the number of pixels of the output monitor, and outputs an R signal 111R, a G signal S111G, a B signal S111B, and a superposition coefficient S111α.

The synthesizer 112 synthesizes the first video signal outputted from the RGB converter 106 and the second video signal outputted from the format converter 111. In this first embodiment, the synthesizer 112 synthesizes the R signal S106R, G signal S106G, and B signal S106B of the inputted video signal with the R signal S111R, G signal S111G, and B signal S111B according to the ratio of the superposition coefficient S111α, and outputs the synthesized R signal S112R, G signal S112G, and B signal B112B to the monitor 113 for image display.

The audio processor 107 processes an audio signal S102A outputted from the AV switch 102. The audio output unit 108 amplifies an audio signal S107 outputted from the audio processor 107 and outputs it to the speaker 109. The speaker 109 outputs an audio signal S108 outputted from the audio output unit 108.

Next, the format converter according to the first embodiment of the invention will be described in more detail.

Figure 2:
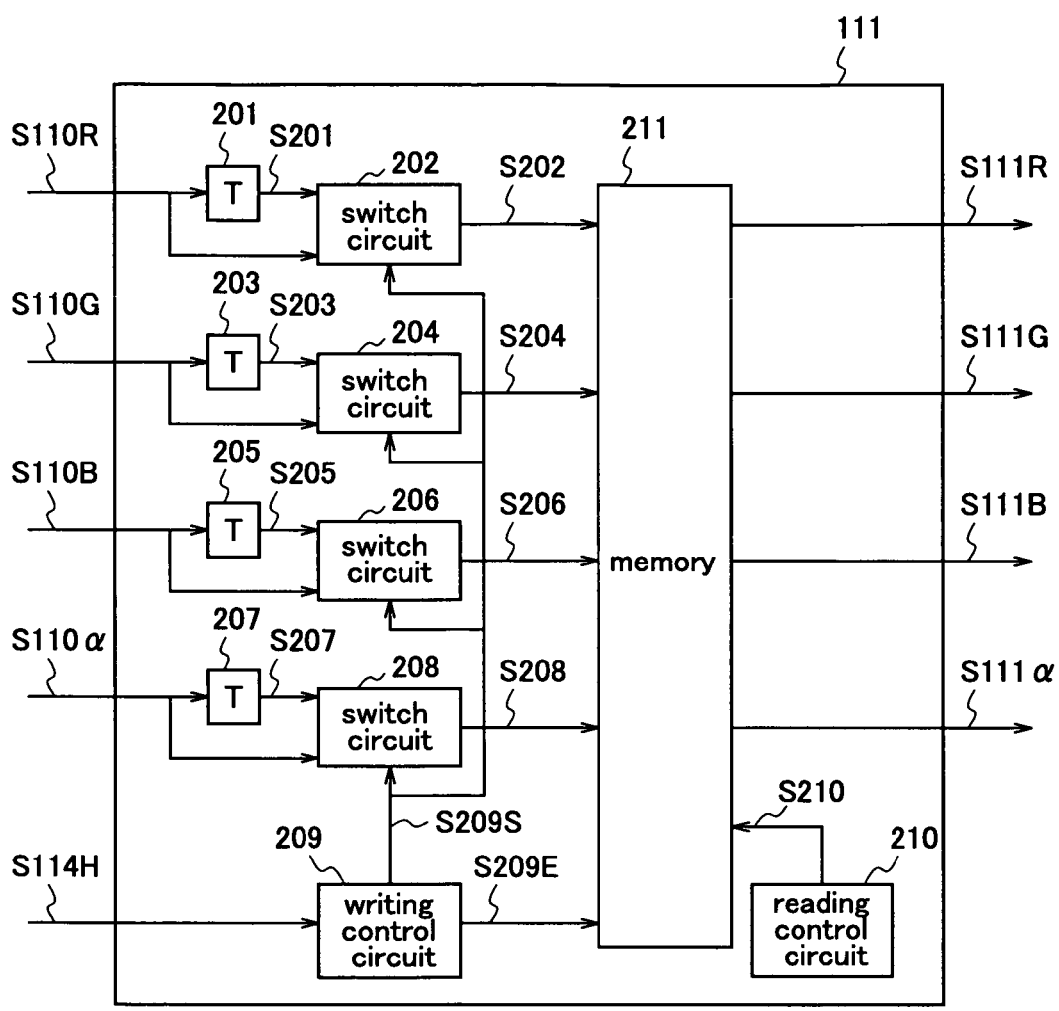
FIG. 2 is a block diagram illustrating an example of a construction of a format conversion apparatus according to the first embodiment.

FIG. 2 is a block diagram illustrating an example of a construction of the format converter 111 according to the first embodiment.

With reference to FIG. 2, the format converter 111 comprises flip-flop circuits 201, 203, 205, and 207, switch circuits 202, 204, 206, and 208, a memory writing control circuit 209, a memory reading control circuit 210, and a memory 211.

The flip-flop circuits 201, 203, 205, and 207 are delay circuits for delaying the input signals S110R, S110G, S110B, and S110α for a pixel interval of data adjacent in the horizontal direction, i.e., for one sampling clock, and these flip-flop circuits output unit-delayed input signals S201, S203, S205, and S207 to the switch circuits 202, 204, 206, and 208, respectively.

The switch circuits 202, 204, 206, and 208 select either the input signals S110R, S110G, S111B, S110α or the unit-delayed input signals S201, S203, S205, S207, respectively, on the basis of a selection signal S209S outputted from the memory writing control circuit 209.

The memory writing control circuit 209 starts processing on the basis the horizontal sync signal S114H, generates a timing signal (thinning-out timing) S209E indicating a timing for thinning out signal data of the input signal and a selection signal S209S for performing signal switching by the switch circuits 202, 204, 206, and 208, and controls writing of the signal data into the memory 211.

The memory reading control circuit 210 controls a reading timing of the signal data stored in the memory 211.

The memory 211 is a storage area in which the signals S202, S204, S206, and S208 outputted from the switch circuits 202, 204, 206, and 208 are temporarily stored.

Figure 3:
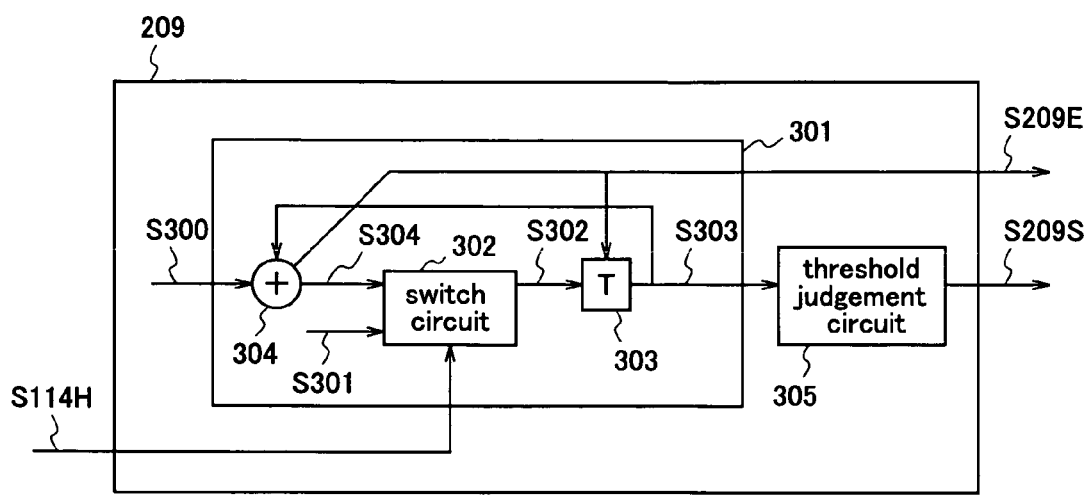
FIG. 3 is a block diagram illustrating an example of a construction of a writing control circuit included in the format conversion apparatus according to the first embodiment.

FIG. 3 is a block diagram illustrating an example of a construction of the memory writing control circuit 209 shown in FIG. 2.

With reference to FIG. 3, the writing control circuit 209 comprises a counter circuit 301 and a threshold judgment circuit 305.

The counter circuit 301 cumulatively adds a resolution conversion coefficient S300 supplied from the outside, for every sampling clock of the input signal, with a first threshold value being a limit. When the cumulative value overflows, the counter circuit 301 outputs a timing signal S209E at a timing of the sampling clock when the overflow occurs, and sets a value obtained by removing a carryout signal from the cumulative value, as a count value for the next sampling clock. The timing signal S209E outputted from the counter circuit 301, which is a signal indicating a thinning-out timing of signal data of the input signal, is also used as an enable signal that permits writing into the memory as described later.

Next, the specific circuit construction of the counter circuit 301 will be described.

As shown in FIG. 3, the counter circuit 301 comprises a switch circuit 302, a load hold type flip-flop 303, and an adder 304.

The switch circuit 302 selects a start value S301, for example, "0", when the horizontal sync signal S114H is inputted. Otherwise, it selects an adder output S304.

The load hold type flip-flop circuit 303 latches the output signal S302 of the switch circuit 302, and outputs the latched value as a count value S303 to the adder 304 and the threshold judgment circuit 305. Further, when the timing signal S209E is output from the adder 304, i.e., when the result of addition by the adder 304 overflows, the value held by the load hold type flip-flop 303 is output to the adder 304 and the threshold judgment circuit 305 as a count value S303 for the next sampling clock.

The adder 304 cumulatively adds the resolution conversion coefficient S300 supplied from the outside, for every sampling clock of the input signal, with the first threshold value being a limit. When the cumulative value overflows, the adder 304 outputs a value obtained by removing a carryout signal from the cumulative value to the load hold type flip-flop circuit 303 as a count value for the next sampling clock. Further, when the result of addition exceeds the first threshold value, the adder 304 outputs the timing signal S209 to the load hold type flip-flop circuit 303 and to the memory 211. The resolution conversion coefficient S300 is calculated according to the resolution conversion ratio that is determined on the basis of the resolution of the display screen, and it may be previously stored in a memory such as a register possessed by the counter circuit 301 or supplied from external equipment such as the microcomputer 110.

The threshold judgment circuit 305 compares the count value outputted from the load hold type flip-flop circuit 303 with a second threshold value that is previously held by the threshold judgment circuit 305, and outputs, as a selection signal S209S, a Low signal when the count value is smaller than the second threshold value, and a High signal when the count value is larger than the second threshold value. When the count value is equal to the second threshold value, whether a Low signal or a High signal should be outputted may be predetermined on the basis of the resolution conversion ratio and the set resolution conversion coefficient. Further, the second threshold value may be supplied from external equipment such as the microcomputer 110.

In the format conversion apparatus constituted as described above, the counter circuit 301 operates as a timing generator for generating a timing at the signal data of the input signal are thinned out using the resolution conversion coefficient that is calculated on the basis of the resolution conversion ratio, and the flip-flop circuits 201, 203, 205, 207, the switch circuits 202, 204, 206, 208, and the threshold judgment circuit 305 operate as a selector for selecting, from two points of input signal data existing before and after the timing generated by the timing generator, signal data that is timewise closer to the timing.

Next, the operation of the format conversion apparatus according to the first embodiment will be described.

Figure 4:
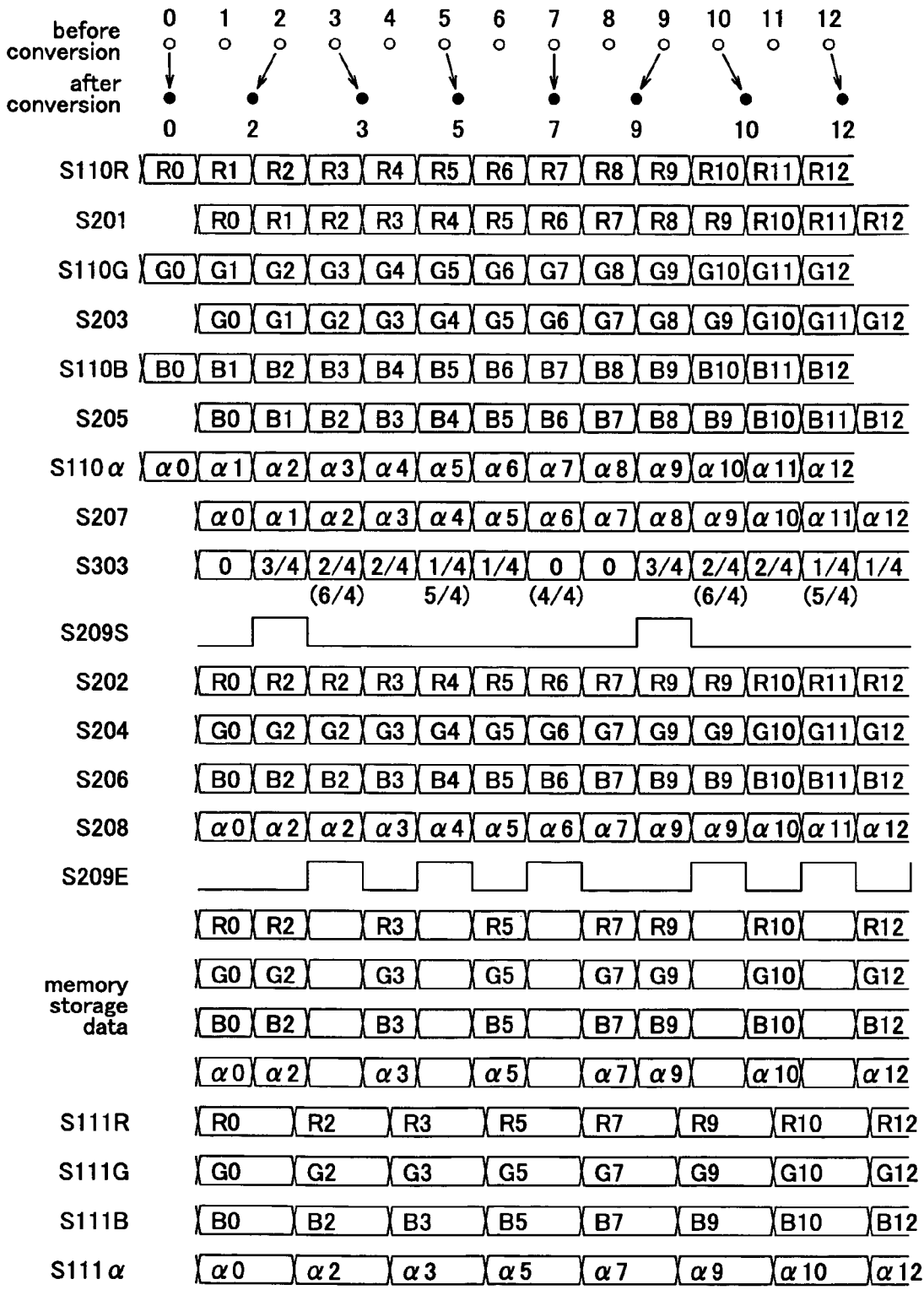
FIG. 4 is a operation timing chart of the format conversion apparatus according to the first embodiment.

FIG. 4 is an example of a timing chart of the format conversion-apparatus according to the first embodiment. In FIG. 4, the R signal S110R, the G signal S110G, the B signal S110B, and the superposition coefficient S111α are input to the format conversion apparatus 111, and the input signals are subjected to format conversion into 4/7 in the horizontal direction.

The inputted R signal S110R, G signal S110G, B signal S110B, and superposition coefficient S110α are delayed by the flip-flops 201, 203, 205, and 207 shown in FIG. 2 by a pixel interval of data adjacent in the horizontal direction, i.e., by one sampling period, thereby obtaining the R signal S201, G signal S203, B signal S205, and superposition coefficient S207.

Then, the inputted R signal S110R, G signal S110G, B signal S110B, and superposition coefficient S110α and the delayed R signal S201, G signal S203, B signal S205, and superposition coefficient S207 are input to the switch circuit 202, 204, 206, and 208 shown in FIG. 2, respectively, and the outputs of the respective switch circuits are selected according to the selection signal S209S.

In FIG. 4, S303 denotes a count value generated by the counter circuit 301 of the writing control circuit 209. In FIG. 4, "¾" is set as a resolution conversion coefficient, and the resolution conversion coefficient "¾" is added for every sampling clock of the input signal by the adder 304 of the counter circuit 301. When the cumulative value of the adder 304 is equal to or larger than the first threshold value ("1" in FIG. 4), a value obtained by subtracting a carryout signal from the cumulative value, i.e., a value obtained by subtracting the first threshold value "1" from the cumulative value, is set as a count value S303 for the next sampling clock.

Further, the threshold judgment circuit 305 outputs, as a selection signal S209S, a Low signal when the count value of the counter circuit 301 thus generated is equal to or lower than the second threshold value ("½" in FIG. 4), and a High signal when the count value is larger than the second threshold value.

On the other hand, the counter circuit 301 outputs a timing signal S209E as a timing for thinning out the signal data of the input signal, every time the count value of the counter circuit 301 becomes equal to or larger than the first threshold value ("1").

The writing control circuit 209 shown in FIG. 2 controls writing into the memory 211 on the basis of the selection circuit S209S and the timing signal S209E thus generated. Thereby, from the two points of input signal data existing before and after the timing for thinning out the signal data of the input signal, the signal data that is timewise closer to the timing is selected.

To be specific, by the switch circuits 202, 204, 206, and 208, the outputs S201, S203, S205, and S207 from the flip-flop circuits (delay circuits) 201, 203, 205, and 207 are selected during a period when the selection signal S209 is Low, while the S110R, S110G, S110B, and S110α which are not delayed are selected during a period when the selection signal S209 is High.

Thereafter, the data selected by the switch circuits 202, 204, 206, and 208 are written into the memory 211 during a period when the timing signal S209E is Low, and writing into the memory 211 is not carried out during a period when the timing signal S209E is High. Thereby, the data stored in the memory 211 are memory storage data shown in FIG. 4.

The data written in the memory 211 are read on the basis of a reading control signal 210 outputted from the memory reading control circuit 210, and outputted to the synthesizer 112 as the R signal S111R, G signal S111G, B signal S111B, and superposition coefficient S111α which have been format-converted according to the number of pixels of the monitor.

The synthesizer 112 synthesizes the format-converted R signal S111R, G signal S111G, and B signal S111B with the video signals S106R, S106G, and S106B according to the ratio α indicated by the superposition coefficient S111α, and the synthesized signals S112R, S112G, and S112B are output to the monitor 113.

Figure 5:
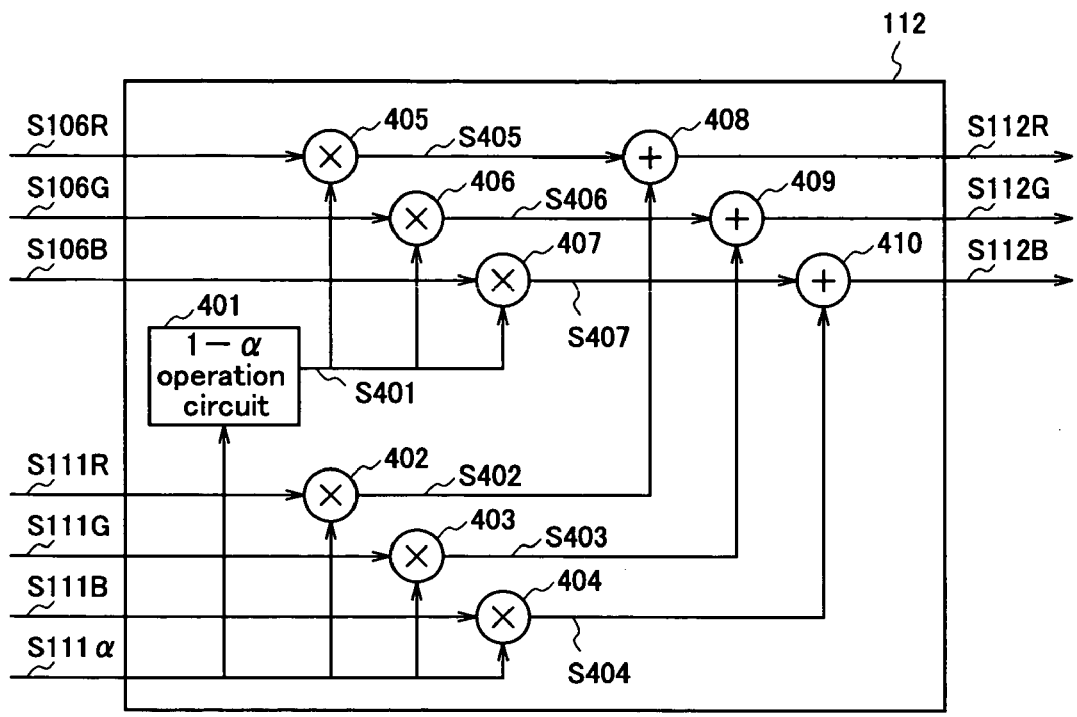
FIG. 5 is a block diagram illustrating an example of a construction of a synthesizer included in the image display apparatus according to the first embodiment.

FIG. 5 is a block diagram illustrating an example of a construction of the synthesizer 112 shown in FIG. 1.

In FIG. 5, the synthesizer 112 comprises a 1-α operation circuit 401, multipliers 402, 403, 404, 405, 406, and 407, and adders 408, 409, and 410.

As shown in FIG. 5, the video signals S106R, S106G, and S106B are input to the multipliers 405, 406, and 407, respectively. The superposition coefficient S111α read from the memory 211 is input to the 1-α operation circuit 401 and the multipliers 402, 403, and 404. Further, the R signal S111R, the G signal S111G, and the B signal S111B read from the memory 211 are input to the multipliers 402, 403, and 404, respectively.

The 1-α operation circuit 401 performs an operation for obtaining 1-α from the ratio α indicated by the superposition coefficient S111α, and the result of the operation is output to the multipliers 405, 406, and 407.

Then, the R signal S405 outputted from the multiplier 405 and the R signal S402 outputted from the multiplier 402 are added by the adder 408 to obtain a synthesis R signal S112R. Likewise, the G signal S406 outputted from the multiplier 406 and the G signal S403 outputted from the multiplier 403 are added by the adder 409 to obtain a synthesis G signal S112G. Further, the B signal S407 outputted from the multiplier 407 and the B signal S404 outputted from the multiplier 404 are added by the adder 410 to obtain a synthesis B signal S112B.

Next, the operation of the format conversion apparatus according to the first embodiment will be described in more detail with reference to a flowchart shown in FIG. 6.

Figure 6:
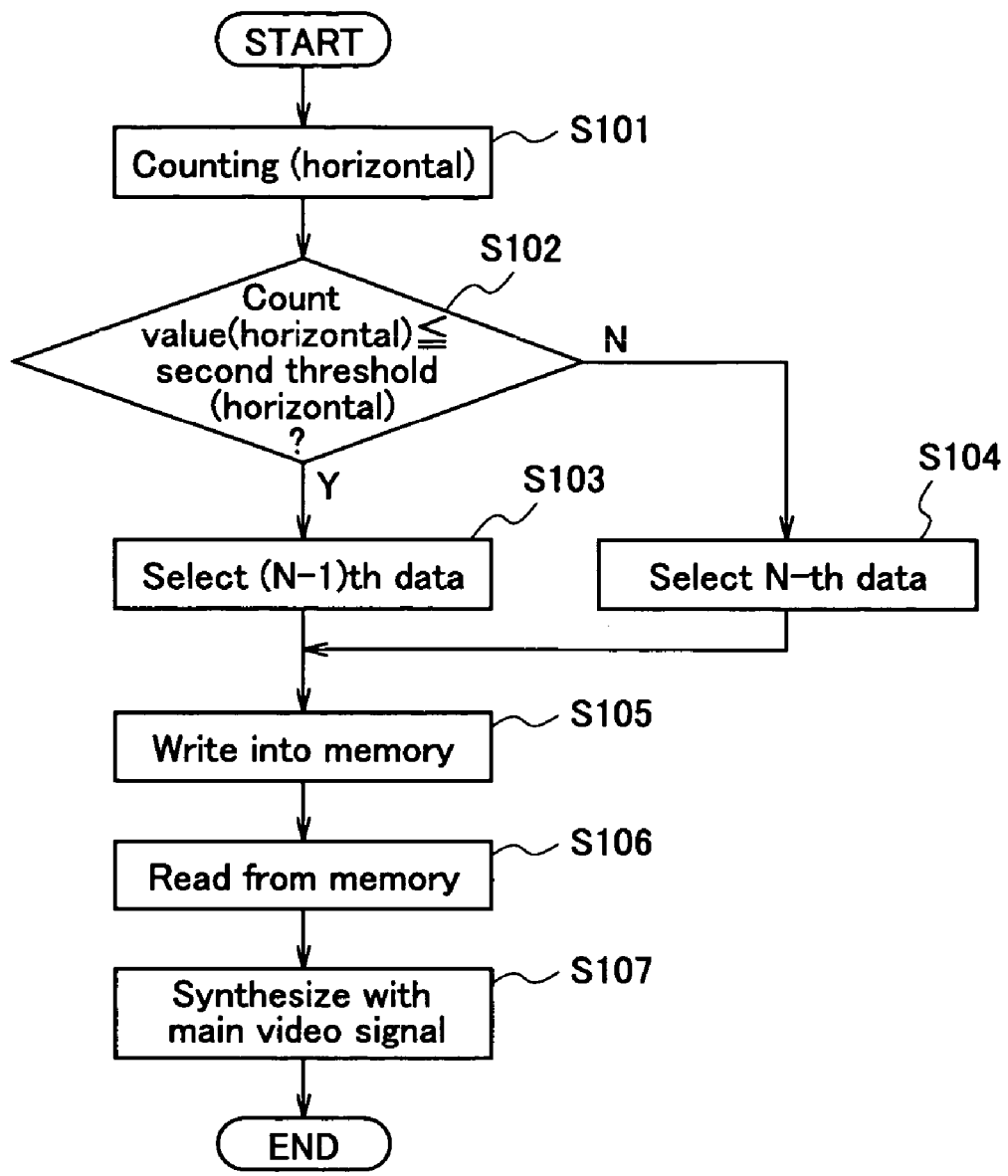
FIG. 6 is a flowchart for explaining format conversion in the horizontal direction to be performed by the format conversion apparatus according to the first embodiment.

FIG. 6 is a flowchart for explaining the format conversion process in the horizontal direction, which is carried out by the format conversion apparatus according to the first embodiment.

(Step S101)

When the horizontal sync signal S114H is input to the counter circuit 301, the counter circuit 301 cumulatively adds the resolution conversion coefficient S300 supplied from the outside, for every sampling clock of the input signal, with the first threshold value being a limit. When the cumulative value overflows, the counter circuit 301 outputs the timing signal S209E at the timing of the sampling clock when the overflow occurs, and sets a value obtained by subtracting a carryout signal from the cumulative value, as a count value for the next sampling clock.

(Step S102)

Thereafter, the count value of the counter circuit 301 is compared with the second threshold value by the threshold judgment circuit 305.

(Steps S103 and S104)

As the result of the comparison, when the count value is equal to or lower than the second threshold value, the (N-1)th data (N: natural number) of the input signal is selected by the switch circuits 202, 204, 206, and 208, as described using FIG. 4. On the other hand, when the count value is larger than the threshold value, the N-th data of the input signal is selected. When the count value is equal to the second threshold value, the (N-1)th data is selected.

(Step S105)

The writing control circuit 209 operates as a controller for controlling writing of signal data into the memory 211 on the basis of the timing signal S209E that is generated during counting process of the counter circuit 301, and thinning out the signal data of the input signal.

(Step S106)

The signal data written in the memory are read out under control of the reading control circuit 210 to be output to the synthesizer 112.

(Step S107)

The signal data read from the memory are synthesized with the main video signal by the synthesizer 112, and a synthesis signal is output to the monitor 113.

As described above, according to the format conversion apparatus of the first embodiment, even when performing conversion of the number of pixels in the horizontal direction in order to perform channel display, menu display, and display of text information multiplexed in a blanking period, which are called on-screen display, it is possible to prevent color blurring or output of a medium color during an interpolation process when performing conversion of the number of pixels, thereby preventing degradations in the image qualities of on-screen display and display of texts and characters. Further, according to the format conversion apparatus of the first embodiment, it is possible to realize format conversion of an input signal while maintaining the ratio of combination of the R signal, G signal, B signal, and superposition coefficient at a constant value.

Embodiment 2

Next, a format conversion apparatus according to a second embodiment of the present invention will be described.

In the format conversion apparatus according to the second embodiment, when selecting adjacent data as a target of change in the number of pixels, a singular point having no correlation is not thinned out but is selected with priority, whereby display can be carried out without damaging the only one singular point data when thinning out the image.

Figure 7:
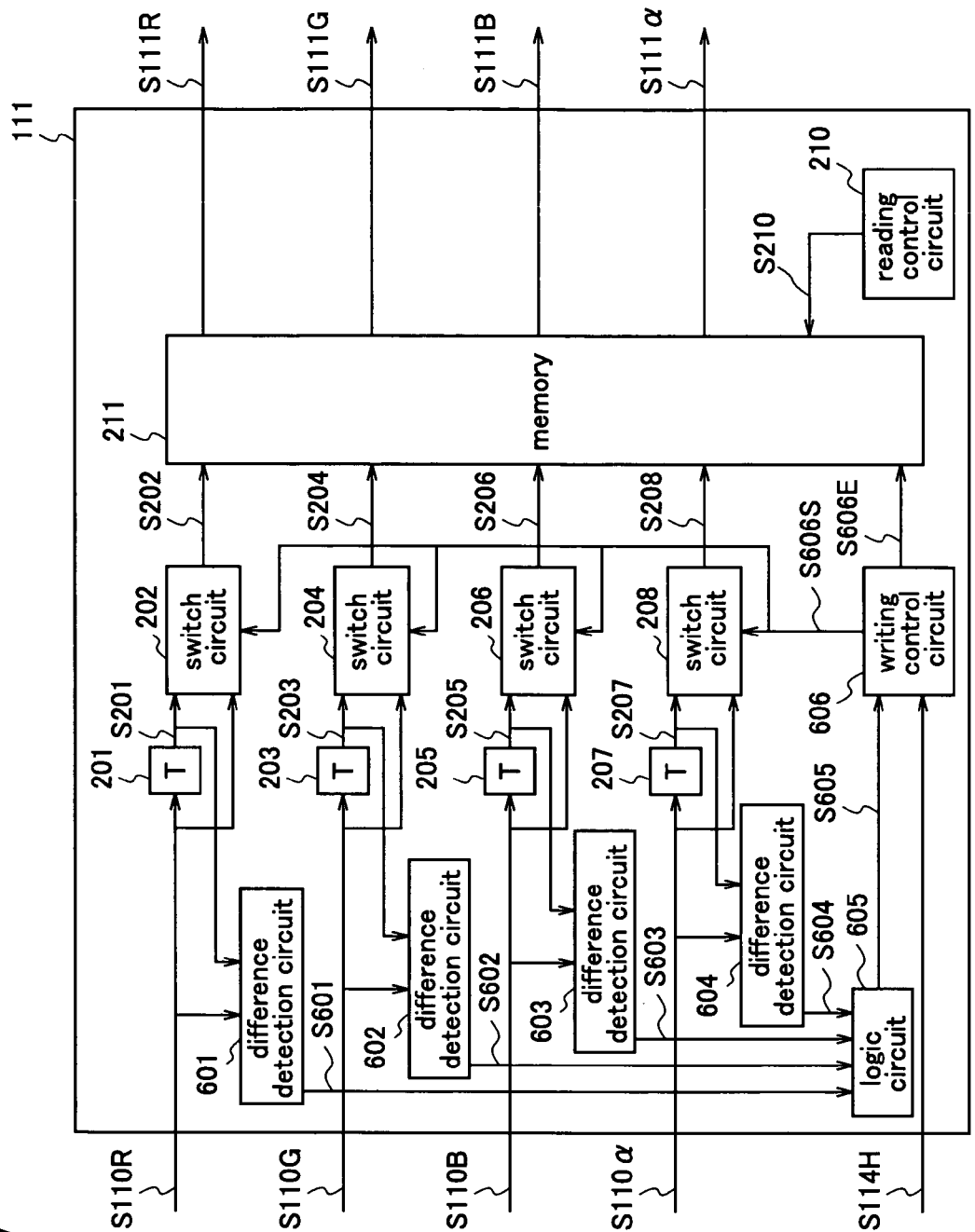
FIG. 7 is a block diagram illustrating an example of a construction of a format conversion apparatus according to a second embodiment of the present invention.

FIG. 7 is a block diagram illustrating an example of a construction of a format conversion apparatus according to the second embodiment of the invention.

In FIG. 7, the format conversion apparatus comprises flip-flop circuits 201, 203, 205, and 207, switch circuits 202, 204 206, and 208, a memory reading control circuit 210, a memory 211, difference detection circuits 601, 602, 603, and 604, a logic circuit 605, and a memory writing control circuit 606. The same constituents as those of the format conversion apparatus according to the first embodiment are given the same reference numerals and, therefore, repeated description is not necessary.

The difference detection circuits 601, 602, 603, and 604 detect differences-between the input signals S110R, S110G, S110B, and S110α, and the input signals S201, S203, S205, and S207 which are unit-delayed by the flip-flop circuits 201, 203, 205, and 207, respectively.

The logic circuit 605 compares the difference values obtained by the difference detection circuits 601, 602, 603, and 604 with a third threshold value, respectively. When at least one difference value is equal to or larger than the third threshold value, the logic circuit 605 operates as a detector for detecting the corresponding signal data as a singular point, and outputs a singular point signal S605 indicating the detected singular point to the writing control circuit 606. The detected singular point is indicated by a High signal.

The memory writing control circuit 606 starts processing on the basis of the horizontal sync signal S114H, and generates a timing signal S606E indicating a timing for thinning out the signal data of the input signal, and a selection signal S606S for performing signal switching by the switch circuits 202, 204, 206, and 208, on the basis of the singular point signal S605 outputted from the logic circuit 605. When the singular point is detected by the logic circuit 605, the memory writing control circuit 606 generates a timing signal S606E and a selection signal S606S so that the singular point is selected with priority. Further, the memory writing control circuit 606 controls writing of the signal data into the memory 211 on the basis of the generated timing signal S606E.

Figure 8:
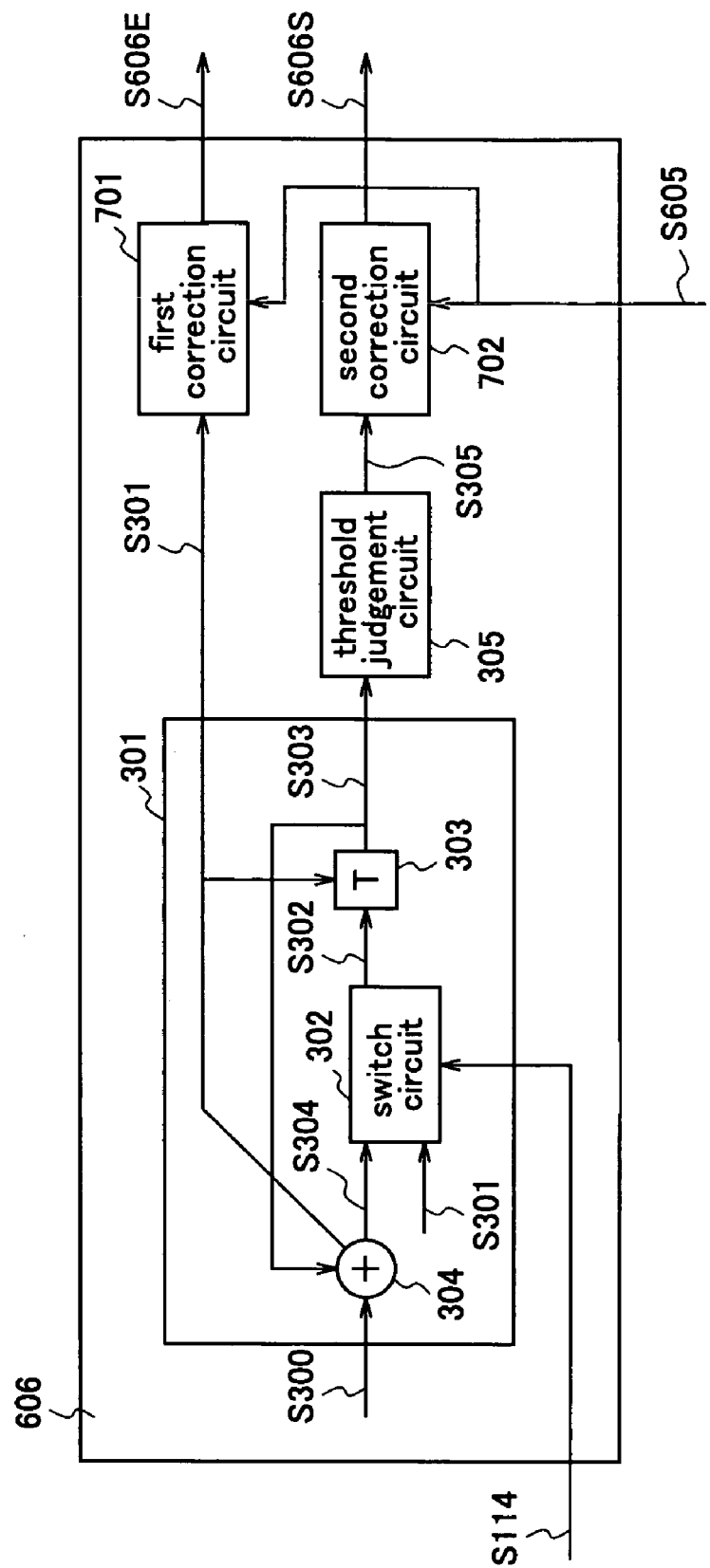
FIG. 8 is a block diagram illustrating an example of a construction of a writing control circuit included in the format conversion apparatus according to the second embodiment.

FIG. 8 is a block diagram illustrating an example of a construction of the memory writing control circuit 606 shown in FIG. 7.

In FIG. 8, the writing control circuit 606 comprises a counter circuit 301, a threshold judgment circuit 305, a first correction circuit 701, and a second correction circuit 702.

The counter circuit 301 cumulatively adds a resolution conversion coefficient S300 supplied from the outside, for every sampling clock of the input signal, with a first threshold value being a limit. When the cumulative value overflows, the counter circuit 301 outputs a timing signal S301 at a timing of the sampling clock when the overflow occurs, and sets a value obtained by subtracting a carryout signal from the cumulative value, as a count value for the next sampling clock.

The first correction circuit 701 adds a correction to the timing signal S301 generated by the counter circuit 301. When a singular point is detected by the logic circuit 605, the first correction circuit 701 generates a timing signal S606E so that the singular point indicated by the singular point signal S605 is selected. In this second embodiment, when the High signal of the timing signal S301 from the counter circuit 301 overlaps the High signal of the singular point signal S605, the first correction circuit 701 performs a correction to shift the High signal of the timing signal S301 by one sampling forward. There is another method of adding a correction to the first threshold value of the counter circuit 301 on the basis of the singular point signal S605.

Then, the timing signal S606E outputted from the first correction circuit 701 is used as a signal indicating the thinning-out timing of the signal data of the input signal, and as an enable signal that permits writing into the memory, which will be described later.

The threshold judgment circuit 305 compares the count value outputted from the load hold type flip-flop circuit 303 with the second threshold value that is previously held by the threshold judgment circuit 305, and outputs, as a selection signal S309, a Low signal when the count value is smaller than the second threshold value, and a High signal when the count value is larger than the second threshold value. When the count value is equal to the second threshold value, whether a Low signal or a High signal should be outputted may be predetermined on the basis of the resolution conversion ratio and the set resolution conversion coefficient.

The second correction circuit 702 adds a correction to the selection signal S305 generated by the threshold judgment circuit 305. When a singular point is detected by the logic circuit 605, the second correction circuit 702 generates a selection signal S606S so that the singular point indicated by the singular point signal S605 is selected by the switch circuits 202, 204, 206, and 208. In this second embodiment, when the High signal of the selection signal S305 from the threshold judgment circuit 305 overlaps the High signal of the singular point signal S605, the second correction circuit 702 performs a correction to change the High signal of the selection signal S305 to a Low signal. Further, there is another method of adding a correction to the second threshold value possessed by the threshold judgment circuit 305 on the basis of the singular point signal S605.

In the format conversion apparatus constructed as described above, the counter circuit 301 and the first correction circuit 701 serve as a timing generator which generates a timing for thinning out the signal data of the input signal using the resolution conversion coefficient that is calculated on the basis of the resolution conversion ratio, and the flip-flop circuits 201, 203, 205, 207, the switch circuits 202, 204, 206, 208, the threshold judgment circuit 305, and the second correction circuit 702 serve as a selector which selects, from two points of input signal data existing before and after the timing generated by the timing generator, the signal data that is timewise closer to the timing.

Further, the flip-flop circuits 201, 203, 205, 207, the difference detection circuits 601, 602, 603, 604, and the logic circuit 605 serve as a singular point detector which detects that the input signal data is a singular point that changes by more than the third threshold value with respect to the nearest signal data.

Next, the operation of the format conversion apparatus according to the second embodiment will be described.

Figure 9:
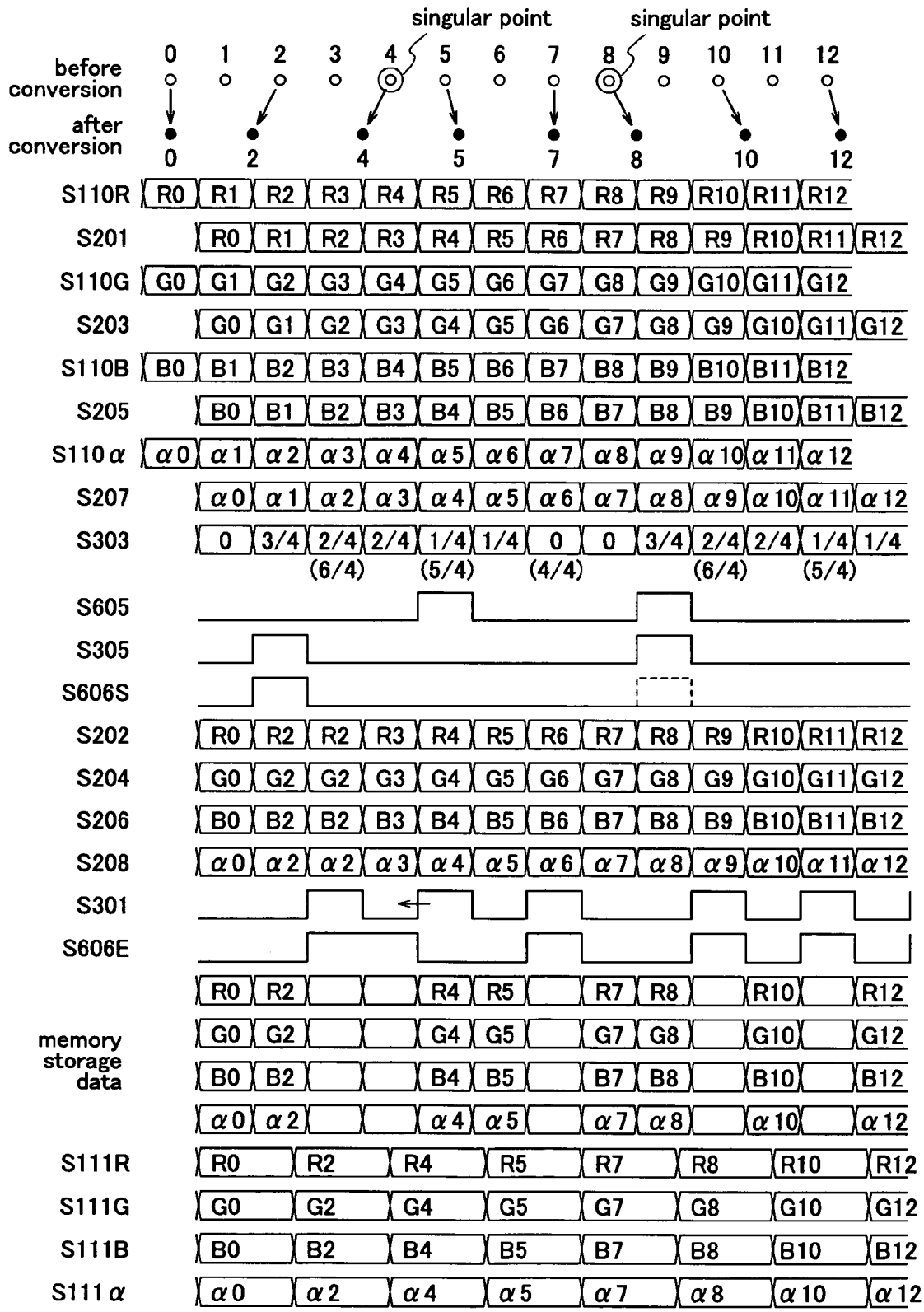
FIG. 9 is an operation timing chart of the format conversion apparatus according to the second embodiment.

FIG. 9 is an example of a timing chart of the format conversion apparatus according to the second embodiment. In FIG. 9, the R signal S110R, the G signal S110G, the B signal S110B, and the superposition coefficient S110α are input to the format conversion apparatus 111, and the input signals are subjected to format conversion into 4/7 in the horizontal direction.

The inputted R signal S110R, G signal S110G, B signal S110B, and superposition coefficient S110α are delayed by the flip-flops 201, 203, 205, and 207 shown in FIG. 7 by a pixel interval of data adjacent in the horizontal direction, i.e., by one sampling period, thereby obtaining the R signal S201, G signal S203, B signal S205, and superposition coefficient S207.

Then, the inputted R signal S110R, G signal S110G, B signal S110B, and superposition coefficient S110a and the delayed R signal S201, G signal S203, B signal S205, and superposition coefficient S207 are input to the switch circuit 202, 204, 206, and 208 shown in FIG. 7, respectively, and the outputs of the respective switch circuits are selected according to the selection signal S606S.

In FIG. 9, S303 denotes a count value generated by the counter circuit 301 of the writing control circuit 606. In FIG. 9, "¾" is set as a resolution conversion coefficient, and the resolution conversion coefficient "¾" is added for every sampling clock of the input signal by the adder 304 of the counter circuit 301. When the cumulative value of the adder 304 is equal to or larger than the first threshold value ("1" in FIG. 9), a value obtained by subtracting a carryout signal from the cumulative value, i.e., a value obtained by subtracting the first threshold value "1" from the cumulative value, is set as a count value S303 for the next sampling clock.

Further, the threshold judgment circuit 305 outputs, as a selection signal S305, a Low signal when the count value of the counter circuit 301 thus generated is equal to or lower than the second threshold value ("½" in FIG. 9), and a High signal when the count value is larger than the second threshold value.

Thereafter, the second correction circuit 702 performs comparison with the singular point signal S605. When the High signal of the selection signal S305 overlaps the High signal of the singular point signal S605, the second correction circuit 702 corrects the High signal of the selection signal S305 to a Low signal, and generates a selection signal S606S.

On the other hand, the counter circuit 301 outputs a timing (thinning-out timing) signal S301 as a timing for thinning out the signal data of the input signal, every time the count value of the counter circuit 301 becomes equal to or larger than the first threshold value ("1").

Thereafter, the first correction circuit 701 performs comparison with the singular point signal S605. When the High signal of the timing signal S301 overlaps the High signal of the singular point signal S605, the first correction circuit 701 performs a correction to shift the High signal of the timing signal S301 by one sampling forward, thereby generating a timing signal S606E.

Then, the writing control circuit 606 shown in FIG. 7 controls writing into the memory 211 on the basis of the selection circuit S606S and the timing signal S606E thus generated. Thereby, from the two points of input signal data existing before and after the timing for thinning out the signal data of the input signal, the signal data that is timewise closer to the timing is selected.

To be specific, by the switch circuits 202, 204, 206, and 208, the outputs S201, S203, S205, and S207 from the flip-flop circuits (delay circuits) 201, 203, 205, and 207 are selected during a period when the selection signal S606S is Low, while the S110R, S110G, S110B, and S110α which are not delayed are selected during a period when the selection signal S606S is High.

Thereafter, the data selected by the switch circuits 202, 204, 206, and 208 are written into the memory 211 during a period when the timing signal S606E is Low, and writing into the memory 211 is not carried out during a period when the timing signal S606E is High. Thereby, the data stored in the memory 211 are memory storage data shown in FIG. 9.

The data written in the memory 211 are read on the basis of a reading control signal 210 outputted from the memory reading control circuit 210, and outputted to the synthesizer 112 as the R signal S111R, G signal S111G, B signal S111B, and superposition coefficient S111α which have been format-converted according to the number of pixels of the monitor.

The synthesizer 112 synthesizes the format-converted R signal S111R, G signal S111G, and B signal S111B with the video signals S106R, S106G, and S106B according to the superposition coefficient S111α, and the synthesized signals S112R, S112G, and S112B are output to the monitor 113.

Next, the operation of the format conversion apparatus according to the second embodiment will be described in more detail with reference to a flowchart shown in FIG. 10.

Figure 10:
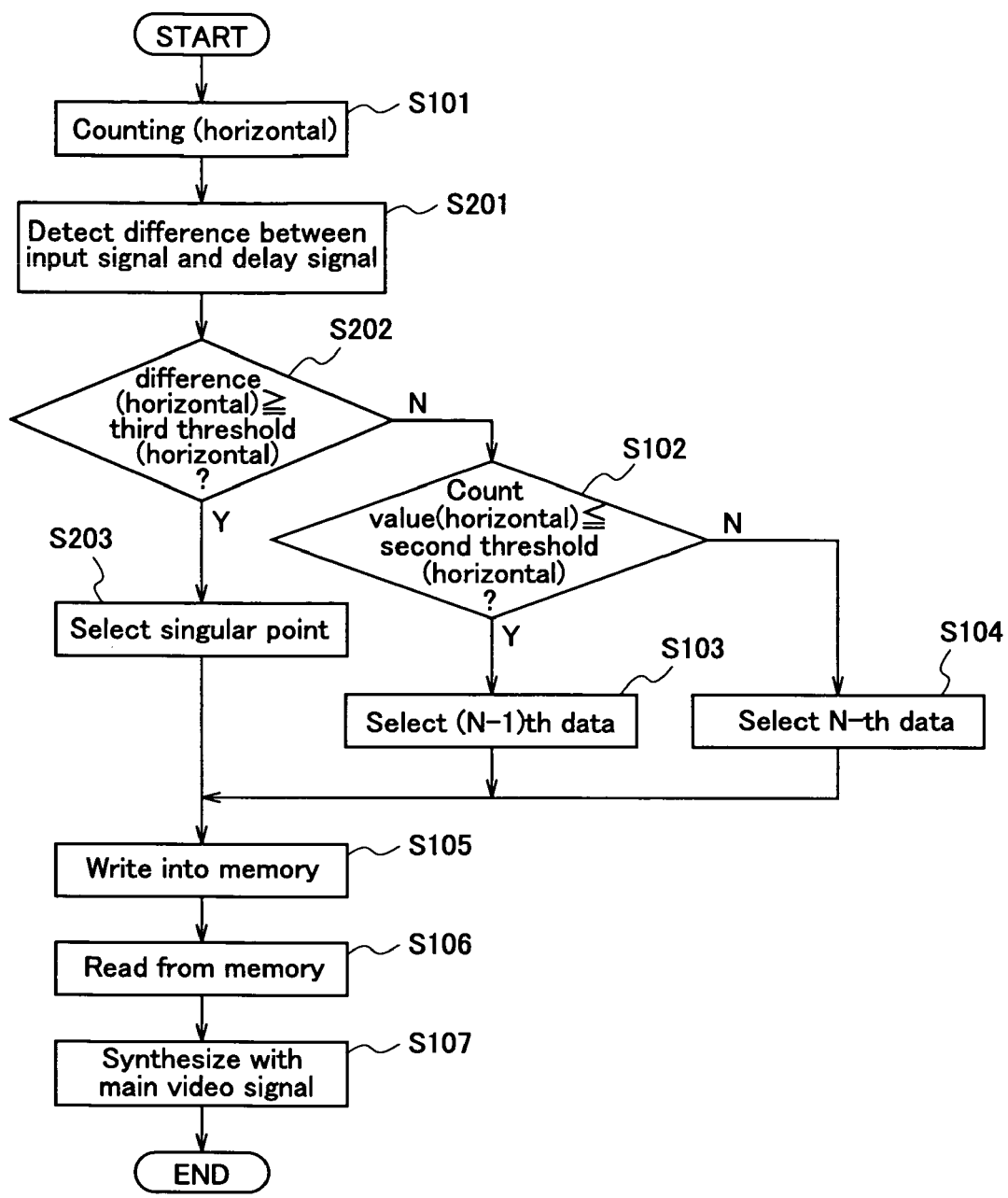
FIG. 10 is a flowchart for explaining format conversion in the horizontal direction to be performed by the format conversion apparatus according to the second embodiment.

FIG. 10 is a flowchart for explaining the format conversion process in the horizontal direction, which is carried out by the format conversion apparatus according to the second embodiment.

(Step S101)

When the horizontal sync signal S114H is input to the counter circuit 301, the counter circuit 301 cumulatively adds the resolution conversion coefficient S300 supplied from the outside, for every sampling clock of the input signal, with the first threshold value being a limit. When the cumulative value overflows, the counter circuit 301 outputs a timing signal S301 at the timing of the sampling clock when the overflow occurs, and sets a value obtained by subtracting a carryout signal from the cumulative value, as a count value for the next sampling clock.

(Step S201)

On the other hand, the difference detection circuits 601, 602, 603, and 604 operate differences between the input signals S110R, S110G, S110B, and S110α, and the input signals S201, S203, S205, and S207 which are unit-delayed by the flip-flops 201, 203, 205, and 207, respectively.

(Step S202)

The logic circuit 605 compares the difference values obtained by the difference detection circuits 601, 602, 603, and 604 with the third threshold value, respectively. When at least one difference value is equal to or larger than the third threshold value, the logic circuit 605 detects the corresponding signal data as a singular point.

(Step S203)

When a singular point is detected by the logic circuit 605, the first correction circuit 701 adds a correction to the timing signal S301 outputted from the counter circuit 310 to generate a timing signal S606E, and the second correction circuit 702 adds a correction to the selection signal S305 outputted from the threshold judgment circuit 305 to generate a selection signal S606S, so that the singular point detected by the logic circuit 605 is selected regardless of the count result of the counter circuit 301 and the judgment result of the threshold judgment circuit 305.

(Steps S102, S103, S104)

On the other hand, when no singular point is detected by the logic circuit 605, selection processes by the switch circuits 202, 204, 206, and 208 are carried out on the basis of the result of comparison between the count value of the counter circuit 301 and the second threshold value by the counter circuit 301 of the threshold judgment circuit 305. To be specific, when the count value is equal to or lower than the second threshold value, the (N-1)th data of the input signal is selected. On the other hand, when the count value is larger than the threshold value, the N-th data of the input signal is selected. When the count value is equal to the second threshold value, the (N-1)th data is selected.

(Step S105)

The writing control circuit 606 operates as a controller for controlling writing of signal data into the memory 211 on the basis of the timing signal S606E that is corrected by the first correction circuit 701, and thinning out the signal data of the input signal.

(Step S106)

The signal data written in the memory are read out under control of the reading control circuit 210 to be output to the synthesizer 112.

(Step S107)

The signal data read from the memory are synthesized with the main video signal by the synthesizer 112, and a synthesis signal is output to the monitor 113.

As described above, according to the format conversion apparatus of the second embodiment, even when performing conversion of the number of pixels in the horizontal direction in order to perform channel display, menu display, and display of text information multiplexed in a blanking period, which are called on-screen display, it is possible to prevent color blurring and output of a medium color during an interpolation process when performing the conversion of the number of pixels, thereby preventing degradations in the image qualities of the on-screen display and the display of texts and characters. Further, according to the format conversion apparatus of the second embodiment, it is possible to realize format conversion of an input signal while maintaining the composition ratio of the R signal, G signal, B signal, and superposition coefficient at a constant value.

Furthermore, according to the format conversion apparatus of the second embodiment, even when there exists a singular point having no correlation with adjacent data, the singular point is not subjected to thinning-out but is selected with priority. Thereby, when thinning out pixels, display of only one point of data can be carried out without missing it. Further, processing the singular point with priority is effective in a thinning-out process in which the number of output pixels is smaller than the number of input pixels. The singular point priority processing may be halted when performing a process other than the thinning-out process, or it can be dispensed with in format conversion with no thinning-out process.

Embodiment 3

Next, a format conversion apparatus according to a third embodiment of the present invention will be described.

The format conversion apparatus according to the third embodiment performs format conversion in the vertical direction in addition to format conversion in the horizontal direction.

Figure 11:
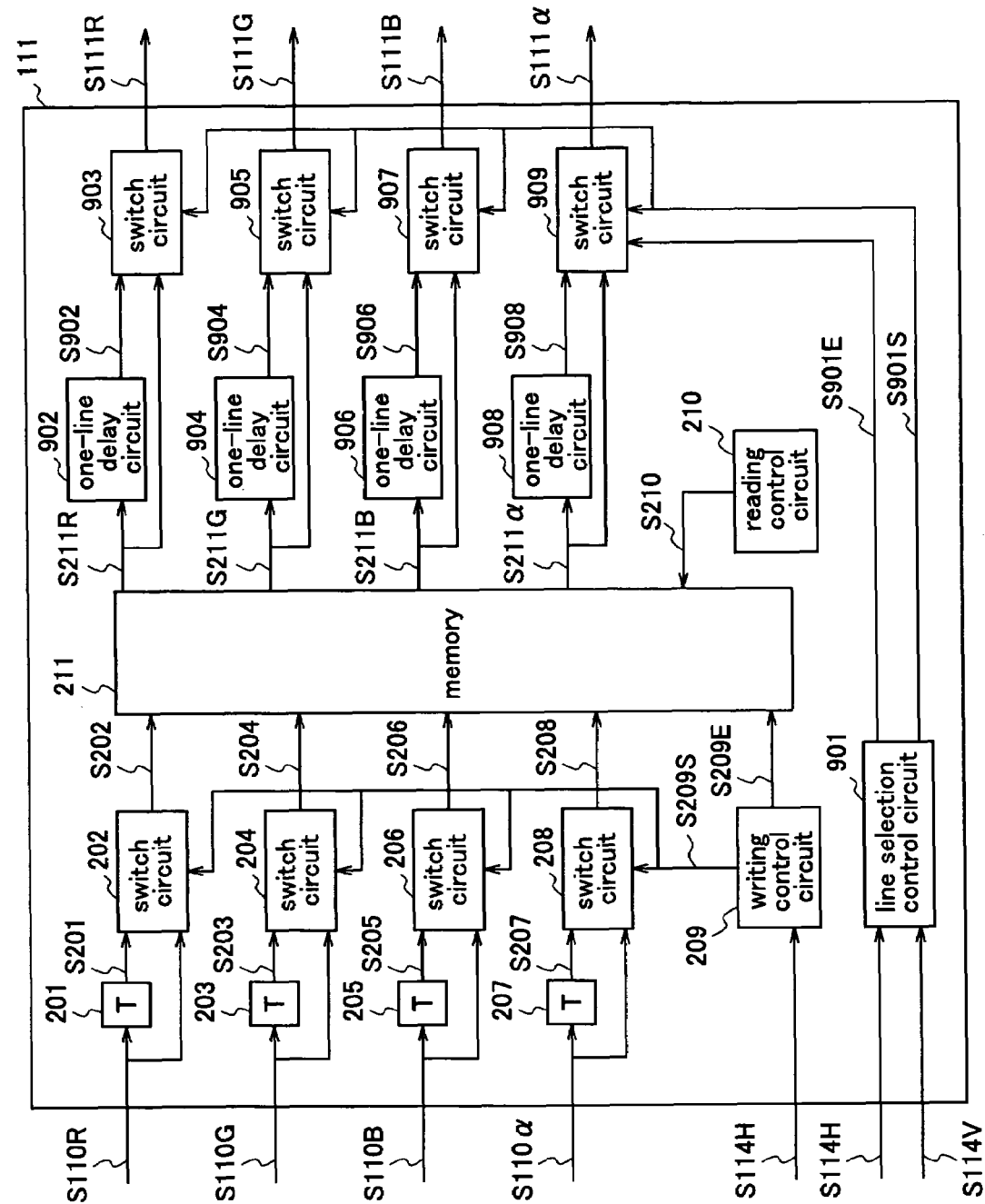
FIG. 11 is a block diagram illustrating an example of a construction of a format conversion apparatus according to a third embodiment of the present invention.

FIG. 11 is a block diagram illustrating an example of a construction of the format conversion apparatus according to the third embodiment.

With reference to FIG. 11, the format conversion apparatus comprises flip-flop circuits 201, 203, 205, and 207, switch circuits 202, 204, 206, and 208, a memory writing control circuit 209, a memory reading control circuit 210, a memory 211, a line selection control circuit 901, one-line delay circuits 902, 904, 906, and 908, and switch circuits 903, 905, 907, and 909. The same constituents as those of the format conversion apparatus according to the first embodiment are given the same reference numerals, and therefore, repeated description is not necessary.

The line selection control circuit 901 starts processing with reference to the vertical sync signal S114V, and generates a timing signal S901E indicating a vertical thinning-out timing for thinning out signal data of an input signal, and a selection signal S901S for performing signal switching by the switch circuits 903, 905, 907, and 909. The timing signal S209E indicates the horizontal thinning-out timing.

The one-line delay circuits 902, 904, 906, and 908 are delay circuits for delaying the signals S211R, S211G, S211B, and S211α which are read from the memory by an interval of data lines that are adjacent in the vertical direction, i.e., by one line interval of the signal data, and outputs unit-delayed signals S902, S904, S906, and S908 to the switch circuits 903, 905, 907, and 909, respectively.

The switch circuits 903, 905, 907, and 909 select either the signals S211R, S211G, S211B, S211α which are read from the memory, or the unit-delayed signals S902, S904, S906, S908, on the basis of the selection signal S901S outputted from the line selection control circuit 901.

Further, on receipt of the timing (vertical thinning-out timing) signal S901E indicating the timing for thinning out the signal data of the input signal from the line selection control circuit 901, the switch circuits 903, 905, 907, and 909 skips the line data selection and output process at this timing.

Figure 12:
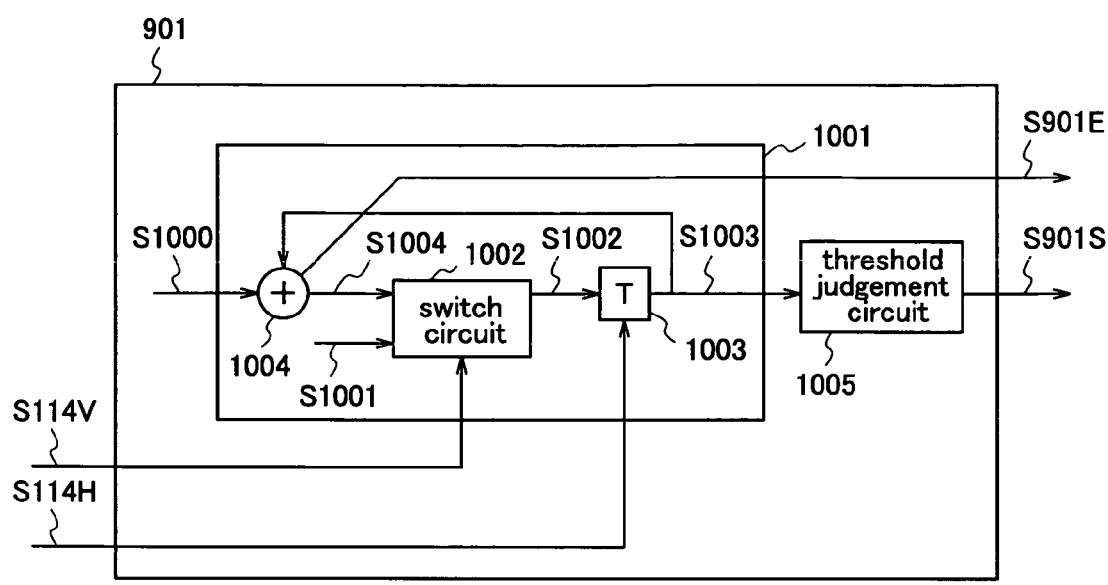
FIG. 12 is a block diagram illustrating an example of a construction of a line selection control circuit included in the format conversion apparatus according to the third embodiment.

FIG. 12 is a block diagram illustrating an example of a construction of the line selection control circuit 901 shown in FIG. 11.

In FIG. 12, the line control circuit 901 comprises a counter circuit 1001 and a threshold judgment circuit 1005.

The counter circuit 1001 cumulatively adds a resolution conversion coefficient S1000 supplied from the outside, every time the horizontal sync signal S114H as a sampling clock is inputted, with a first threshold value (vertical) being a limit. When the cumulative value overflows, the counter circuit 1001 outputs a timing signal S901E at a timing of the sampling clock when the overflow occurs, and sets a value obtained by subtracting a carryout signal from the cumulative value, as a count value for the next sampling clock. The timing signal S901E outputted from the counter circuit 1001 is used as a signal indicating the timing for thinning out the signal data of the input signal, and also it is used as a signal for skipping the selection and output process to be performed by the switch circuits 903, 905, 907, and 909, which is described later.

Next, the specific circuit construction of the counter circuit 1001 will be described.

As shown in FIG. 12, the counter circuit 1001 comprises a switch circuit 1002, a load hold type flip-flop 1003, and an adder 1004.

The switch circuit 1002 selects a start value S1001, for example, "0", when the vertical sync signal S114V is inputted. Otherwise, it selects an adder output S1004.

The load hold type flip-flop circuit 1003 latches the output signal S1002 of the switch circuit 1002, and outputs the latched value as a count value S1003 to the adder 1004 and the threshold judgment circuit 1005. Further, when the timing signal S901E is output from the adder 1004, i.e., when the result of addition by the adder 1004 overflows, the value held by the load hold type flip-flop 1003 is output to the adder 1004 and the threshold judgment circuit 1005 as a count value S1003 for the next sampling clock.

The adder 1004 cumulatively adds the resolution conversion coefficient S1000 supplied from the outside, every time the horizontal sync signal S114H as a sampling clock is inputted, with the first threshold value (vertical) being a limit. When the cumulative value overflows, the adder 1004 outputs a value obtained by subtracting a carryout signal from the cumulative value to the load hold type flip-flop circuit 1003 as a count value for the next sampling clock. Further, when the result of addition exceeds the first threshold value (vertical), the adder 1004 outputs the timing signal S901E to the load hold type flip-flop circuit 1003 and to the reading control circuit 910. The resolution conversion coefficient S1000 is calculated according to the resolution conversion ratio that is determined on the basis of the resolution of the display screen, and it may be previously stored in a memory such as a register possessed by the counter circuit 1001 or supplied from external equipment such as the microcomputer 110 (refer to FIG. 1).

The threshold judgment circuit 1005 compares the count value outputted from the load hold type flip-flop circuit 1003 with a second threshold value (vertical) that is previously held by the threshold judgment circuit 1005, and outputs, as a selection signal S901S, a Low signal when the count value is smaller than the second threshold value (vertical), and a High signal when the count value is larger than the second threshold value (vertical). When the count value is equal to the second threshold value (vertical), whether a Low signal or a High signal should be outputted may be predetermined on the basis of the resolution conversion ratio and the set resolution conversion coefficient. Further, the second threshold value (vertical) may be supplied from external equipment such as the microcomputer 110.

In the format conversion apparatus constituted as described above, the counter circuit 1001 operates as a timing generator for generating a timing for thinning out the signal data of the input signal using the resolution conversion coefficient that is calculated on the basis of the resolution conversion ratio, and the one-line delay circuits 902, 904, 906, 908, the switch circuits 903, 905, 907, 909, and the threshold judgment circuit 305 operate as a selector for selecting, from two points of input signal data existing before and after the timing generated by the timing generator, the signal data that is timewise closer-to the timing.

Next, the operation of the format conversion apparatus according to the third embodiment will be described. Since the format conversion process in the horizontal direction is identical to that described for the first embodiment, only the format conversion process in the vertical direction which is carried out after reading of signal data from the memory 211 will be described hereinafter.

Figure 13:
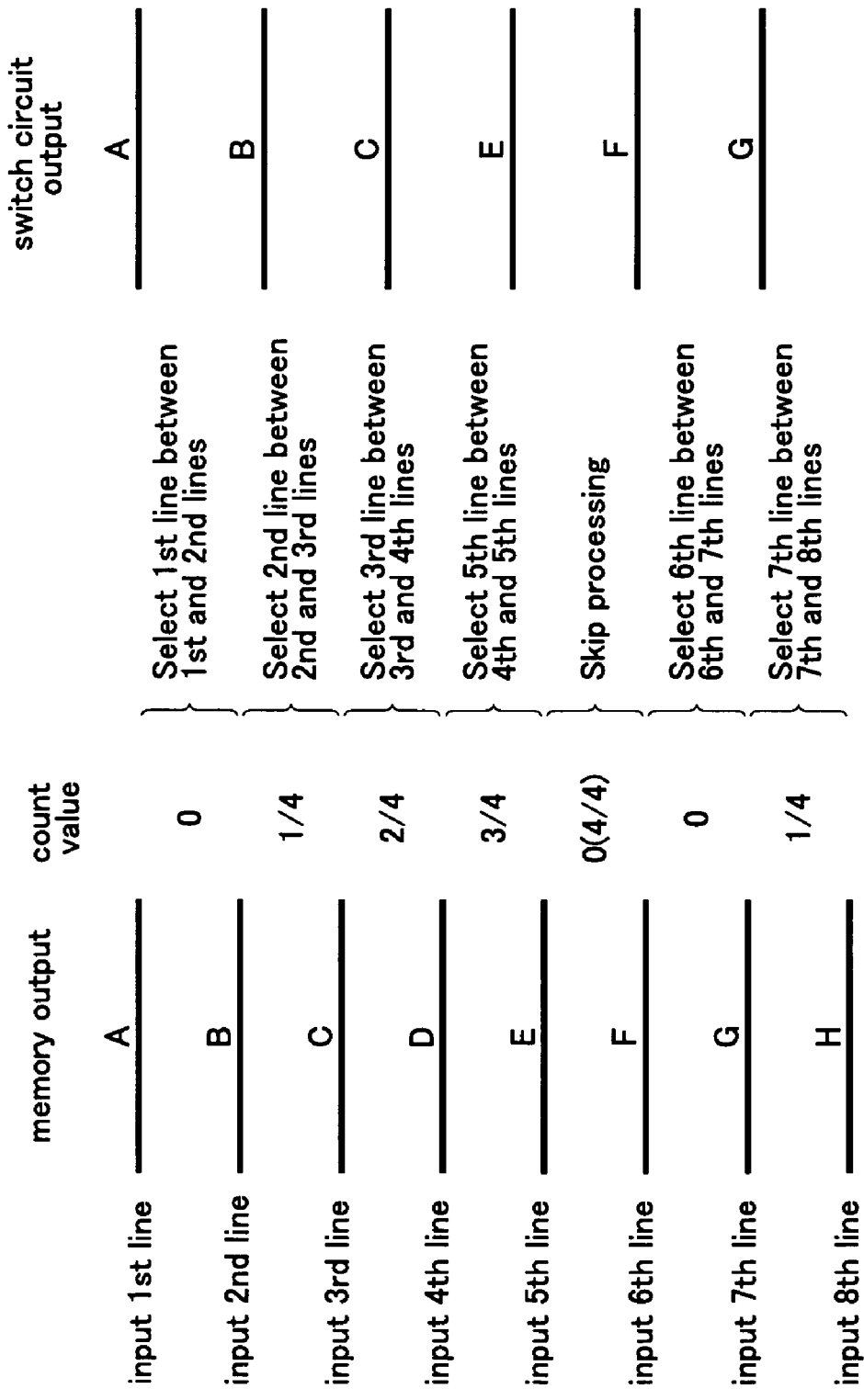
FIG. 13 is a diagram for explaining format conversion in the vertical direction to be performed by the format conversion apparatus according to the third embodiment.

FIG. 13 is a diagram for explaining the format conversion in the vertical direction by the format conversion apparatus according to the third embodiment.

With reference to FIG. 13, the R signal S211R, the G signal S211G, the B signal S211B, and the superposition coefficient S211α are input to the format conversion apparatus 111, and the input signals are subjected to format conversion into ⅘ in the vertical direction. The resolution conversion coefficient S1000 with which the counter circuit 1001 performs cumulative addition is "¼". Further, since the processes for the R signal S211R, G signal S211G, B signal S211B, and superposition coefficient S211α are identical, these outputs are expressed as A to H hereinafter.

In FIG. 13, the memory outputs A to H are line data of the R signal S211R, G signal S211G, B signal S211B, and superposition coefficient S211α which are read from the memory 211. The count values are values counted by the counter circuit 1001 for every horizontal sync signal S114H which is a sampling clock in the vertical direction. The switch circuit outputs A to G are the R signal S111R, G signal S111G, B signal S111B, and superposition coefficient S111α which are outputted from the switch circuits 903, 905, 907, and 909.

Like the writing control circuit 209 of the format conversion apparatus described for the first embodiment, the line selection control circuit 901 generates a timing signal S901E and a selection signal S901S, and outputs these signals to the switch circuits 903, 905, 907, and 909. It is assumed that the first threshold value (vertical) is "1", and the second threshold value (vertical) is "½", as in the first embodiment.

As shown in FIG. 13, initially, when the count value of the counter circuit 1001 is "0", since the count value is smaller than the second threshold value (vertical), the input 1st line A is selected from between the input 1st line A and the input 2nd line B by the switch circuits 903, 905, 907, and 909.

Next, when the resolution conversion coefficient "¼" is added and thereby the count value of the counter circuit 1001 becomes "¼", since the count value is smaller than the second threshold value (vertical), the input 2nd line B is selected from between the input 2nd line B and the input 3rd line C by the switch circuits 903, 905, 907, and 909.

Further, when the resolution conversion coefficient "¼" is added and thereby the count value of the counter circuit 1001 becomes "²/₄", since the count value is smaller than the second threshold value (vertical), the input 3rd line C is selected from between the input 3rd line C and the input 4th line D by the switch circuits 903, 905, 907, and 909.

Further, when the resolution conversion coefficient "¼" is added and thereby the count value of the counter circuit 1001 becomes "¾", since the count value is larger than the second threshold value (vertical), the selection signal S901S becomes High, and the input 5th line E is selected from between the input 4th line D-and the input 5th line E by the switch circuits 903, 905, 907, and 909.

Further, when the resolution conversion coefficient "¼" is added and thereby the count value of the counter circuit 1001 becomes "⁴/₄", the timing signal S901E is output, and the reading control circuit 910 skips selection between the input 6th line F and the input 5th line E which is obtained by delaying the input 6th line F by the one-line delay circuits 902, 904, 906, and 908.

At the next sampling clock, a count value "0" which is obtained by subtracting a carryout signal from the count value "⁴/₄" is set. Since the count value is smaller than the second threshold value (vertical), the input 6th line F is selected from between the input 6th line F and the input 7th line G by the switch circuits 903, 905, 907, and 909.

Thereafter, when the count value of the counter circuit 1001 becomes "¼", since the count value is smaller than the second threshold value (vertical), the input 7th line G is selected from between the input 7th line G and the input 8th line H by the switch circuits 903, 905, 907, and 909.

Thereafter, the similar processing is repeated at the timing of the horizontal sync signal S114H until the next vertical sync signal S114V is inputted.

Next, the format conversion process in the vertical direction by the format conversion apparatus according to the third embodiment will be described with reference to FIG. 14.

Figure 14:
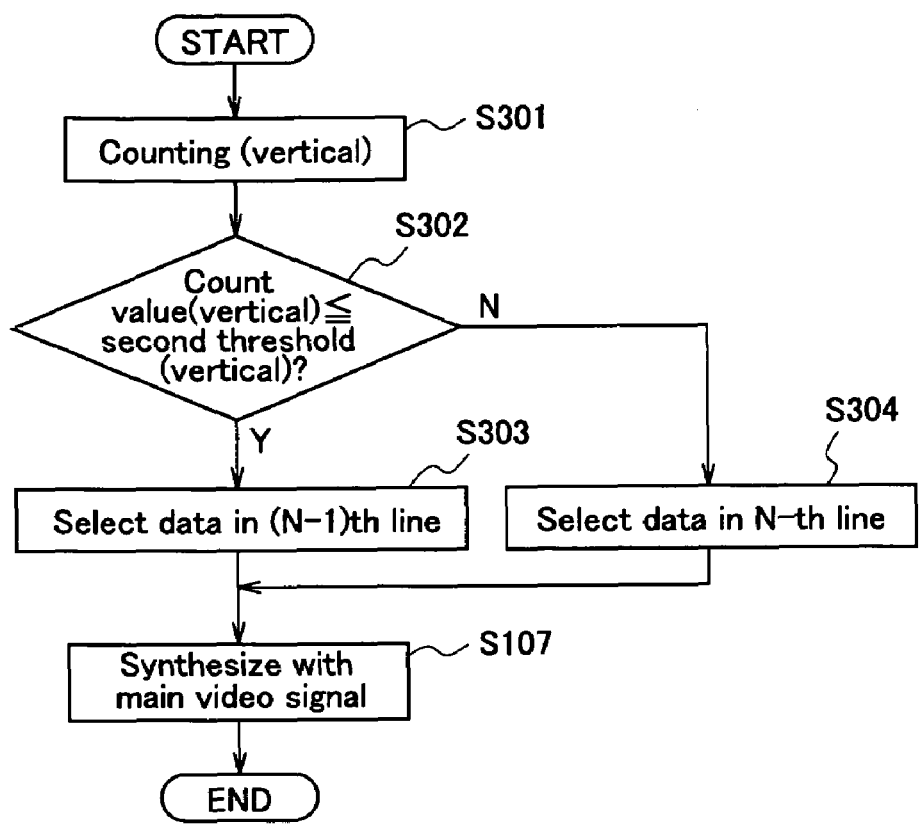
FIG. 14 is a flowchart for explaining format conversion in the vertical direction to be performed by the format conversion apparatus according to the third embodiment.

FIG. 14 is a flowchart for explaining the format conversion process in the vertical direction to be performed by the format conversion apparatus of the third embodiment.

(Step S301)

When the vertical sync signal S114V is input to the counter circuit 1001, the counter circuit 1001 cumulatively adds the resolution conversion coefficient S1000 supplied from the outside, for every horizontal sync signal S114H as the sampling clock of the input signal, with the first threshold value (vertical) being a limit. When the cumulative value overflows, the counter circuit 1001 outputs the timing signal S901E at the timing of the sampling clock when the overflow occurs, and sets a value obtained by subtracting a carryout signal from the cumulative value, as a count value for the next sampling clock.

(Step S302)

Thereafter, the count value of the counter circuit 1001 is compared with the second threshold value (vertical) by the threshold judgment circuit 1005.

(Steps S303 and S304)

As the result of the comparison, when the count value is equal to or lower than the second threshold value (vertical), the (N-1)th data of the input signal is selected by the switch circuits 903, 905, 907, and 909. On the other hand, when the count value is larger than the threshold value (vertical), the N-th data of the input signal is selected. When the count value is equal to the second threshold value (vertical), the (N-1)th data is selected.

Further, when the count value of the counter 1001 becomes equal to or larger than the first threshold value (vertical), the switch circuits 903, 905, 907, and 909 skip the line data selection process at the corresponding timing, on the basis of the timing signal S901E outputted from the line selection control circuit 901.

(Step S307)

Thereafter, the signal data outputted from the switch circuits 903, 905, 907, and 909 are synthesized with the main video signal by the synthesizer circuit 112, and a synthesis signal is output to the monitor 113.

Next, the entire operation of the format conversion apparatus according to the third embodiment will be described in more detail with reference to a flowchart shown in FIG. 15.

Figure 15:
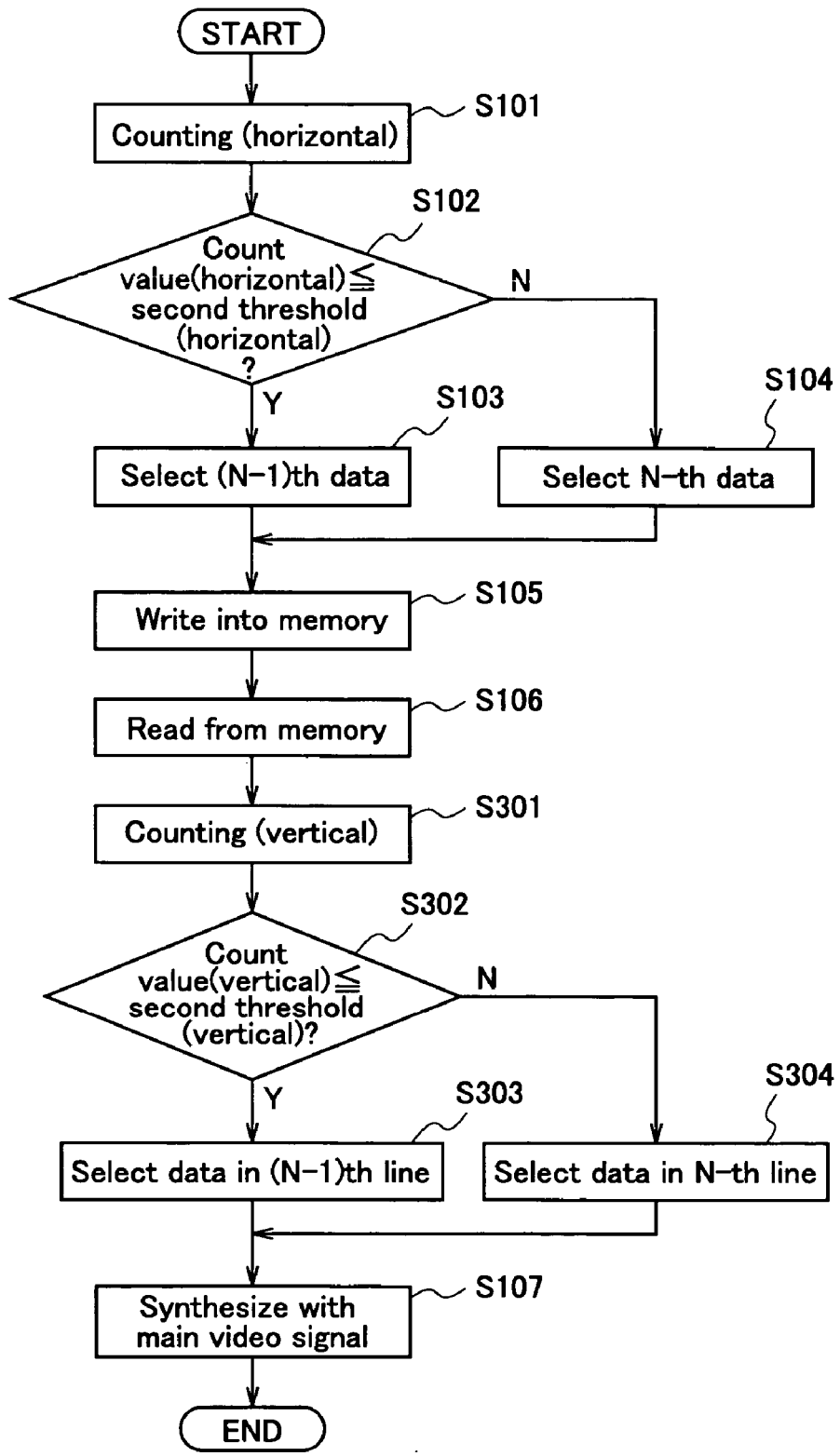
FIG. 15 is a flowchart for explaining the operation of the format conversion apparatus according to the third embodiment.

FIG. 15 is a flowchart for explaining the operation of the format conversion apparatus according to the third embodiment.

With reference to FIG. 15, initially, the format conversion process in the horizontal direction which has been described for the first embodiment with reference to FIG. 6 (Step S101 to Step S106) is carried out, and thereafter, the format conversion process in the vertical direction which has been described for this third embodiment with reference to FIG. 14 (Step S301 to Step S304) is carried out.

Then, the format-converted data are synthesized with the main video signal by the synthesizer, and a synthesis signal is output to the monitor 113 (step S107).

As described above, according to the format conversion apparatus of the third embodiment, even when performing conversion of the number of pixels in the horizontal direction and the vertical direction in order to perform channel display, menu display, and display of text information multiplexed in a blanking period, which are called on-screen display, it is possible to prevent color blurring and output of a medium color during an interpolation process when performing the conversion of the number of pixels, thereby preventing degradations in the image qualities of on-screen display and display of texts and characters. Further, according to the format conversion apparatus of the third embodiment, it is possible to realize format conversion of an input signal while maintaining the combination ratio of the R signal, G signal, B signal, and superposition coefficient at a constant value.

Embodiment 4

Next, a format conversion apparatus according to a fourth embodiment of the present invention will be described.

The format conversion apparatus according to the fourth embodiment performs the process of selecting a singular point with priority according to the second embodiment, in addition to the format conversion processes in the horizontal direction and the vertical direction according to the third-embodiment.

Figure 16:
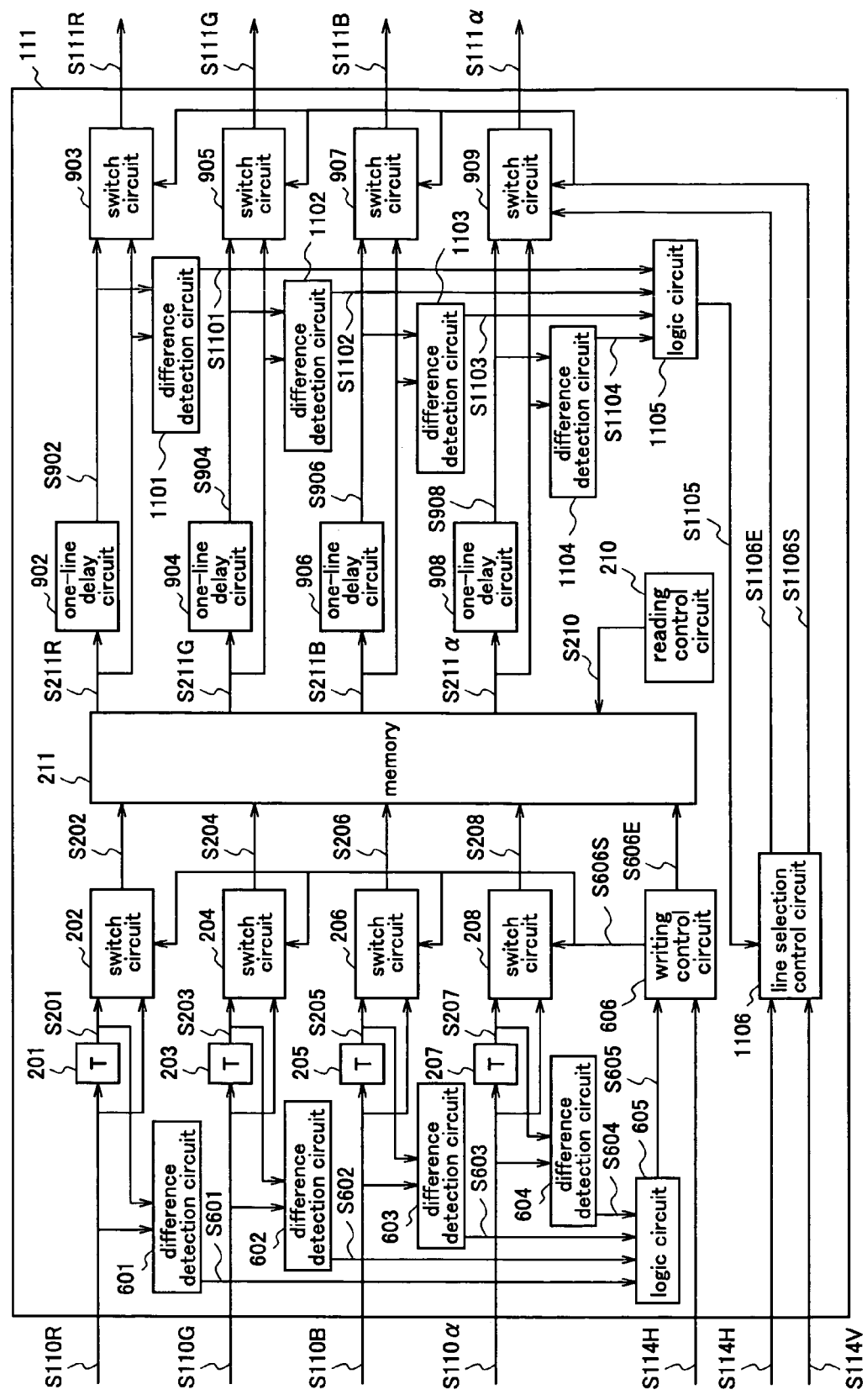
FIG. 16 is a block diagram illustrating an example of a construction of a format conversion apparatus according to a fourth embodiment of the present invention.

FIG. 16 is a block diagram illustrating an example of a construction of the format conversion apparatus according to the fourth embodiment.

With reference to FIG. 16, the format conversion apparatus of the fourth embodiment comprises flip-flop circuits 201, 203, 205, and 207, switch circuits 202, 204, 206, and 208, a memory reading control circuit 210, a memory 211, difference detection circuits 601, 602, 603, and 604, a logic circuit 605, a memory writing control circuit 606, one-line delay circuits 902, 904, 906, and 908, switch circuits 903, 905, 907, and 909, difference detection circuits 1101, 1102, 1103, and 1104, a logic circuit 1105, and a line selection control circuit 1106. The same constituents as those of the format conversion apparatuses according to the first to third embodiments are given the same reference numerals and, therefore, repeated description is not necessary. Further, the difference detection circuits 1101, 1102, 1103, and 1104, the logic circuit 1105, and the line selection control circuit 1106 correspond to the difference detection circuits 601, 602, 603, and 604, the logic circuit 605, and the memory writing control circuit 606, respectively.

Next, the format conversion process in the vertical direction by the format conversion apparatus according to the fourth embodiment will be described with reference to FIG. 17.

Figure 17:
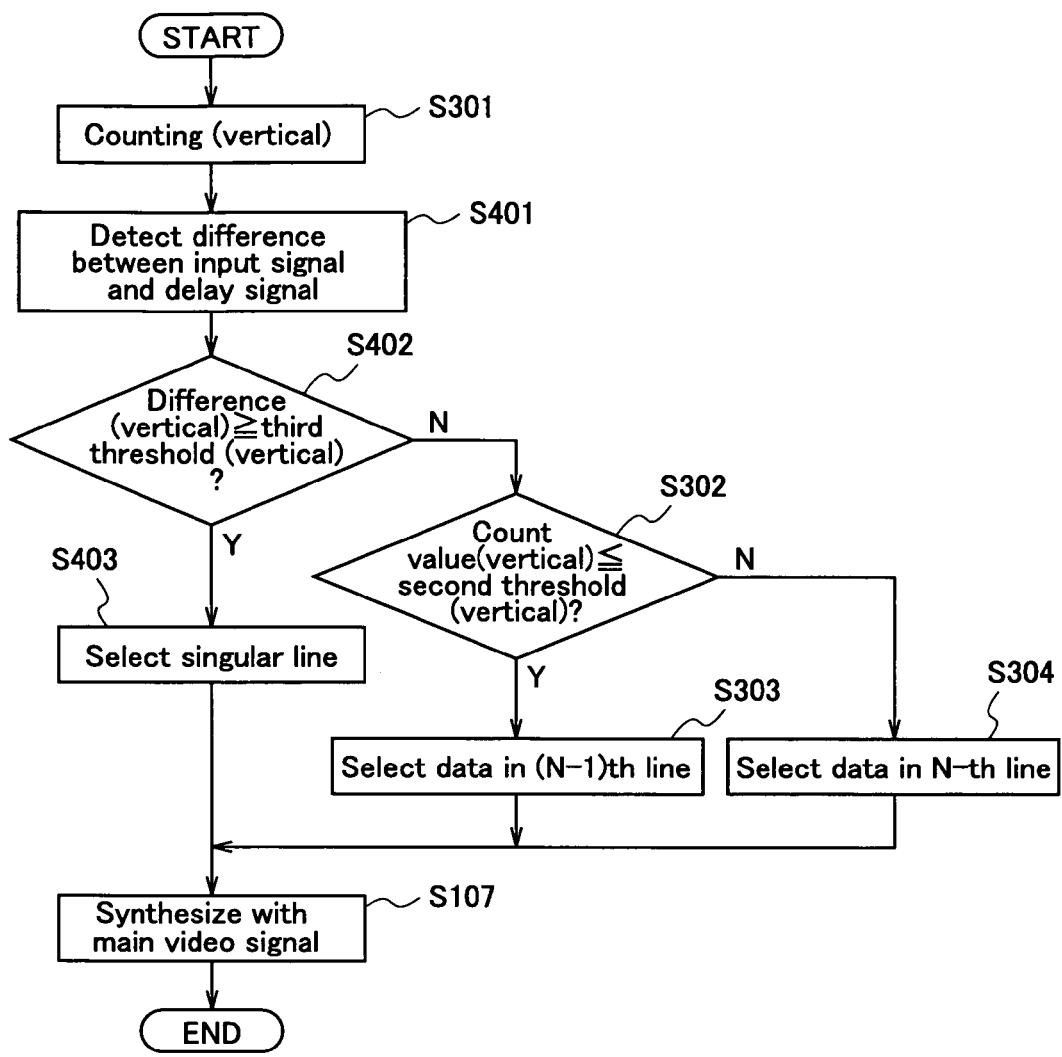
FIG. 17 is a flowchart for explaining format conversion in the vertical direction to be performed by the format conversion apparatus according to the fourth embodiment.

FIG. 17 is a flowchart for explaining the format conversion process in the vertical direction to be performed by the format conversion apparatus of the fourth embodiment.

(Step S301)

When the vertical sync signal S114V is input to the line selection control circuit 1106, the counter circuit possessed by the line selection control circuit 1106 cumulatively adds the resolution conversion coefficient S1000 supplied from the outside, for every horizontal sync signal S114H as the sampling clock of the input signal, with the first threshold value (vertical) being a limit. When the cumulative value overflows, the counter circuit 1001 outputs the timing signal S1106E at the timing of the sampling clock when the overflow occurs, and sets a value obtained by subtracting a carryout signal from the cumulative value, as a count value for the next sampling clock.

(Step S401)

On the other hand, the difference detection circuits 1101, 1102, 1103, and 1104 detect differences between the input signals S211R, S211G, S211B, S211α, and the input signals S902, S904, S906, and S908 which are unit-delayed by the one-line delay circuits 902, 904, 906, and 908, respectively.

(Step S402)

The logic circuit 1105 compares the difference values obtained by the difference detection circuits 1101, 1102, 1103, and 1104 with the third threshold value (vertical). When at least one difference value is equal to or larger than the third threshold value (vertical), the corresponding signal data is detected as a singular point.

(Step S403)

When a singular point is detected by the logic circuit 1105, control is carried out so as to select the singular point according to the timing signal 1106E and the selection signal S1106S which are generated by performing predetermined correction with the line selection control circuit, on the basis of the singular point signal S1105.

(Steps S302, S303, S304)

On the other hand, when no singular point is detected by the logic circuit 1105, selection by the switch circuits 903, 905, 907, and 909 is carried out on the basis of the result of comparison between the count value of the counter circuit possessed by the line selection control circuit 1106 and the second threshold value (vertical). To be specific, when the count value is equal to or lower than the second threshold value (vertical), data in the (N-1)th line of the input signal is selected. When the count value is larger than the threshold value (vertical), data in the N-th line of the input signal is selected. When the count value is equal to the second threshold value (vertical), data in the (N-1)th line is selected.

(Step S107)

Thereafter, the signal data outputted from the switch circuits 903, 905, 907, and 909 are synthesized with the main video signal by the synthesizer circuit 112, whereby a synthesis signal is output to the monitor 113.

Next, the entire operation of the format conversion apparatus according to the fourth embodiment will be described in more detail with reference to a flowchart shown in FIG. 18.

Figure 18:
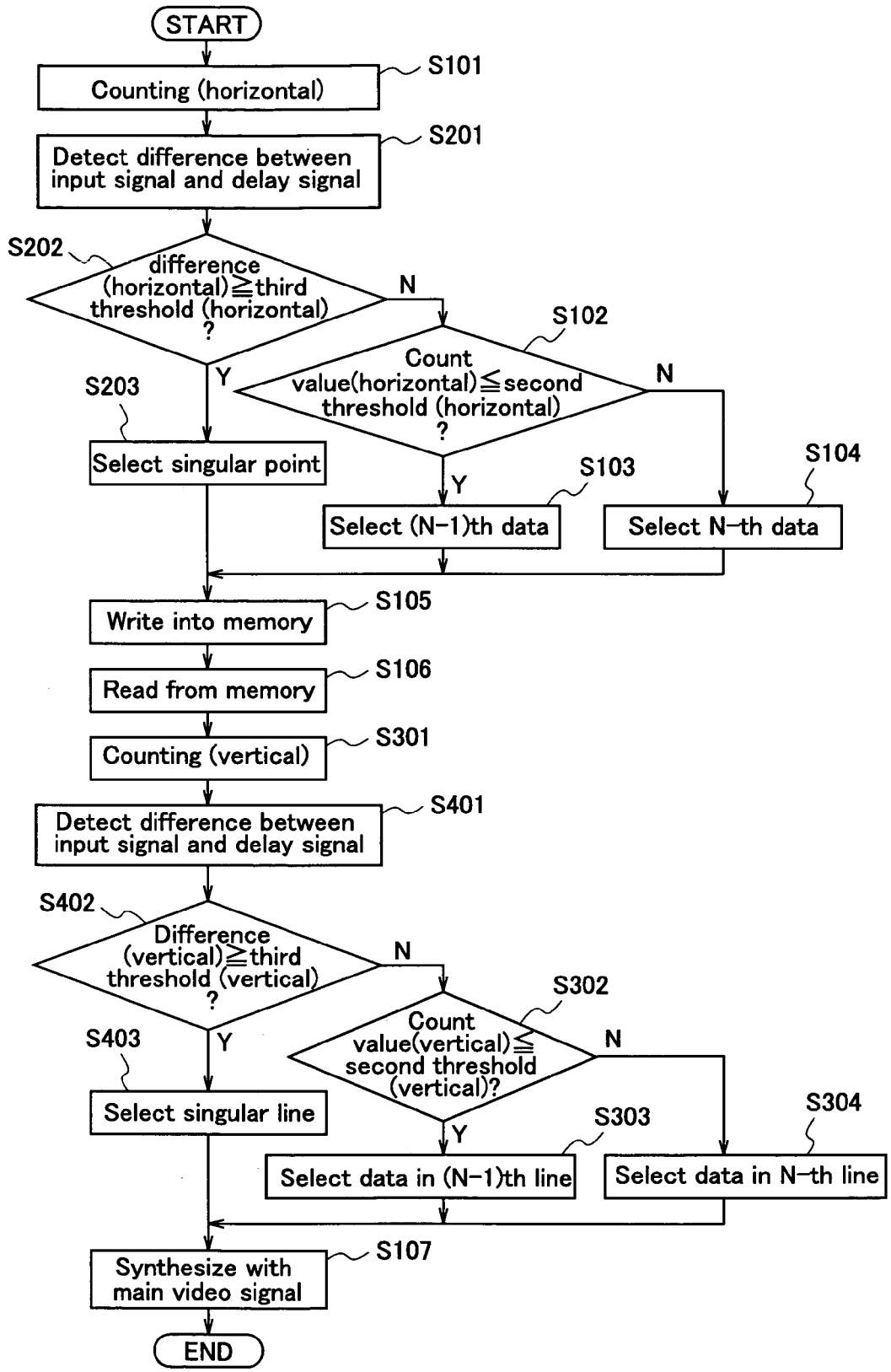
FIG. 18 is a flowchart for explaining the operation of the format conversion apparatus according to the fourth embodiment.
Figure 19:
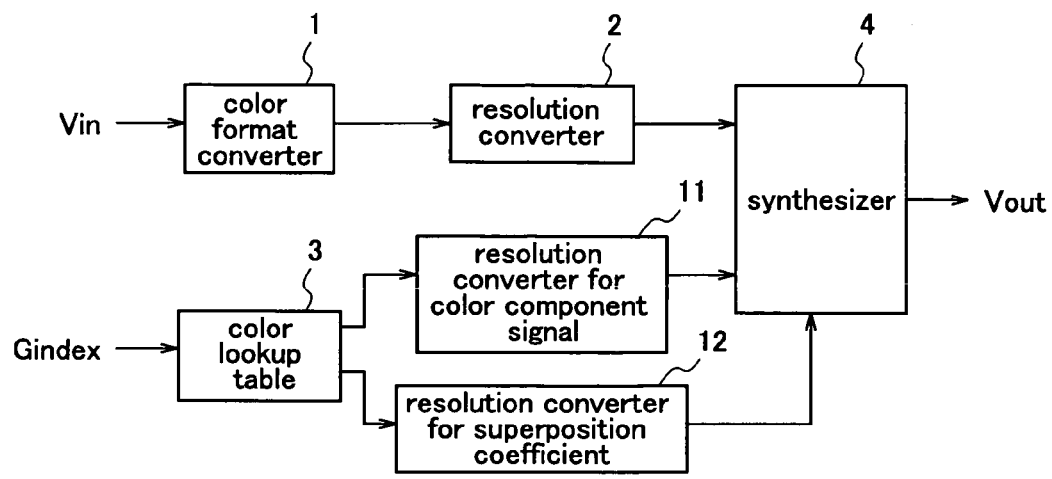
FIG. 19 is a block diagram illustrating the schematic construction of the conventional format conversion apparatus.
Figure 20:
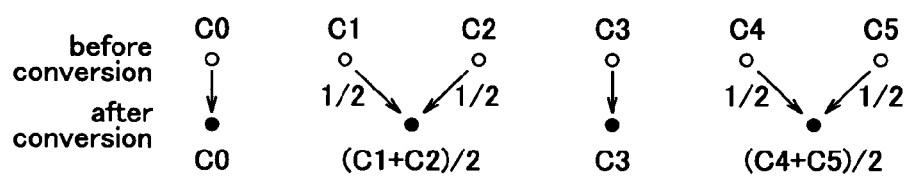
FIG. 20 is a diagram for explaining format conversion by the conventional format conversion apparatus.

FIG. 18 is a flowchart for explaining the operation of the format conversion apparatus according to the fourth embodiment.

With reference to FIG. 18, initially, the format conversion process in the horizontal direction which has been described for the second embodiment with reference to FIG. 10 (Step S101 to Step S106, and Step S201 to Step S203) is carried out, and thereafter, the format conversion process in the vertical direction which has been described for the fourth embodiment with reference to FIG. 17 (Step S301 to Step S304, and Step S401 to Step S403) is carried out.

Then, the format-converted data are synthesized with the main video signal by the synthesizer, and a synthesis signal is output to the monitor 113 (Step S107).

As described above, according to the format conversion apparatus of the fourth embodiment, even when performing conversion of the number of pixels in the horizontal direction and the vertical direction in order to perform channel display, menu display, and display of text information multiplexed in a blanking period, which are called on-screen display, it is possible to prevent color blurring and output of a medium color during an interpolation process when performing the conversion of the number of pixels or lines, thereby preventing degradations in image qualities of on-screen display and display of texts and characters. Further, according to the format conversion apparatus of the fourth embodiment, it is possible to realize format conversion of an input signal while maintaining the combination ratio of the R signal, G signal, B signal, and superposition coefficient at a constant value.

Further, according to the format conversion apparatus of the fourth embodiment, when there exists a singular point having no correlation with adjacent data, the singular point is outputted with priority. Thereby, when thinning out pixels, display of only one point of data can be carried out without missing it. Further, processing the singular point with priority is effective in a thinning-out process in which the number of output pixels is smaller than the number of input pixels. The singular point priority processing may be halted when performing a process other than the thinning-out process, or it can be dispensed with in format conversion with no thinning-out process.

While in the respective embodiments of the invention the format conversion apparatus performs format conversion of the RGB signals outputted from the microcomputer, signals to be subjected to format conversion may be output signals from a storage apparatus and a LSI other than the microcomputer. Further, while in the respective embodiments image synthesizing is carried out using the superposition coefficient, a video signal and an OSD signal or the like may be synthesized without using the superposition coefficient.

Further, in the first and second embodiments, thinning-out of data is carried out under control of writing into the memory based on the timing signal when performing format conversion in the horizontal direction, while in the third and fourth embodiments thinning-out of data is carried out by skipping the selective output process of the switch circuits on the basis of the timing signal when performing format conversion in the vertical direction. However, the data thinning-out method is not restricted to those mentioned above. For example, when performing format conversion in the vertical direction, the outputs from the switch circuits are temporarily stored in a memory, and the data are thinned out by control of writing into the memory on the basis of the timing signal, like the format conversion process in the horizontal direction.

Further, in the second and fourth embodiments, when a singular point is detected, control is carried out so as to select the singular point with priority. However, when, between the signal data positioned before and after the timing for thinning out the signal data of the input signal, the signal data in the singular point is timewise farther than the other signal data by a predetermined time from the thinning-out timing, the signal data which is not in the singular point may be selected.

Furthermore, although in the third and fourth embodiments the format conversion processes in the horizontal direction and the vertical direction are carried out, even when performing only the format conversion in the vertical direction, the format conversion process in the vertical direction described for the third and fourth embodiments may be applied similarly.

Moreover, the present invention can be realized by programming the procedure for executing the processes described for the respective embodiments, and executing the program by such as a CPU (Central Processing Unit) of a computer. The program itself may be stored in various kinds of storage media such as a flexible disk, an optical disc, a semiconductor storage device and the like, or it can be transmitted through a communication cable such as the Internet.

APPLICABILITY IN INDUSTRY

According to the format conversion apparatus of the present invention, even when format conversion is carried out in the horizontal direction or the vertical direction according to the resolution of the display screen, color blurring or output of medium color can be avoided, and therefore, it is useful as an apparatus for converting a signal format of a pixel display device such as a liquid crystal television or a plasma television. Furthermore, it is also applicable to display format conversion of a television receiver such as a CRT-based television.

What is claimed is:

1. A format conversion apparatus for subjecting data having a predetermined resolution to conversion of the resolution according to a resolution of a display screen, said apparatus comprising:
    a timing generation unit for generating a timing for thinning out inputted signal data, using a resolution conversion coefficient that is calculated on the basis of a conversion ratio of the resolution; and
    a selection unit for selecting, from two pieces of input signal data existing before and after the thinning-out timing generated by the timing generation unit, the signal data that is timewise closer to the thinning-out timing;
    wherein
    said timing generation unit comprises a counter unit for cumulatively counting the resolution conversion coefficient for every sampling clock of the input signal, with a first threshold value as a limit, and when the count value overflows, said counter unit setting a value obtained by removing a carryout signal from the count value, as a count value for the next sampling clock; and
    a timing of the sampling clock at which the count value of the counter unit becomes equal to or larger than the first threshold value is outputted as a thinning-out timing for thinning out the inputted signal data.

2. A format conversion apparatus as defined in claim 1 wherein said selection unit comprises:
    a threshold judgment unit for comparing the count value of the counter unit with a second threshold value;
    a delay unit for delaying the input signal by an interval of pixels that are adjacent to each other in the horizontal direction; and a switch unit for selecting either the input signal or the signal delayed by the delay unit, on the basis of the result of judgment by the threshold judgment unit.

3. A format conversion apparatus as defined in claim 1 wherein said selection unit comprises:
a threshold judgment unit for comparing the count value of the counter unit with a second threshold value;
a delay unit for delaying the input signal by an interval of lines that are adjacent to each other in the vertical direction; and
a switch unit for selecting either the input signal or the signal delayed by the delay unit, on the basis of the result of judgment by the threshold judgment unit.

4. A format conversion apparatus as defined in claim 1 further including:
a singular point detection unit for detecting a singular point of the input signal data, at which a difference between the input signal data and signal data nearest to the input signal data is equal to or larger than a third threshold value; and
said selection unit selecting the signal data at the singular point, when either of the two pieces of input signal data existing before and after the timing generated by the timing generation unit corresponds to the singular point of the input signal data.

5. A format conversion apparatus as defined in claim 4 wherein said singular point detection unit comprises:
a delay unit for delaying an input signal by an interval of pixels that are adjacent to each other in the horizontal direction;
a difference detection unit for detecting a difference between the input signal and the signal delayed by the delay unit; and
a detection unit for detecting the input signal data as a singular point of input signal data when the result of detection by the difference detection unit is equal to or larger than the third threshold value.

6. A format conversion apparatus as defined in claim 4 wherein said singular point detection unit comprises:
a delay unit for delaying the input signal by an interval of lines that are adjacent to each other in the vertical direction;
a difference detection unit for detecting a difference between the input signal and the signal delayed by the delay unit; and
a detection unit for detecting the input signal data as a singular point of the input signal data when the result of detection by the difference detection unit is equal to or larger than the third threshold value.

7. A format conversion apparatus for subjecting data having a predetermined resolution to conversion of the resolution according to a resolution of a display screen, said apparatus comprising:
a horizontal direction timing generation unit for generating a horizontal direction thinning-out timing for thinning out input signal data using a resolution conversion coefficient that is calculated on the basis of a conversion ratio of resolution in the horizontal direction;
a horizontal direction selection unit for selecting, from two pieces of pixel data existing before and after the horizontal direction thinning-out timing generated by the horizontal direction timing generation unit, the pixel data that is timewise closer to the horizontal thinning-out timing;
a vertical direction timing generation unit for generating a vertical direction thinning-out timing for thinning out input signal data using a resolution conversion coefficient that is calculated on the basis of a conversion ratio of resolution in the vertical direction; and
a vertical direction selection unit for selecting, from two pieces of line data existing before and after the vertical thinning-out timing generated by the vertical direction timing generation unit, the line data that is timewise closer to the vertical thinning-out timing;
wherein
at least one of said horizontal direction timing generation unit and said vertical direction timing generation unit comprises a counter unit for cumulatively counting the resolution conversion coefficient for every sampling clock of the input signal, with a first threshold value as a limit, and when the count value overflows, said counter unit setting a value obtained by removing a carryout signal from the count value, as a count value for the next sampling clock; and
a timing of the sampling clock at which the count value of the counter unit becomes equal to or larger than the first threshold value is outputted as a thinning-out timing for thinning out the inputted signal data.

8. A format conversion method for subjecting data having a predetermined resolution to conversion of the resolution according to a resolution of a display screen, said method comprising:
a timing generation step of generating, with a timing generation unit, a timing for thinning out inputted signal data, using a resolution conversion coefficient that is calculated on the basis of a conversion ratio of the resolution; and
a selection step of selecting, from two pieces of input signal data existing before and after the thinning-out timing generated by the timing generation unit, the signal data that is timewise closer to the thinning-out timing;
wherein
said timing generation step comprises performing, with a counter unit, a counting process of cumulatively counting the resolution conversion coefficient for every sampling clock of the input signal, with a first threshold value as a limit, and setting a value obtained by removing a carryout signal from the count value as a count value for the next sampling clock, when the count value overflows; and
outputting a timing of the sampling clock at which the count value of the counter unit becomes equal to or larger than the first threshold value, as a thinning-out timing for thinning out the inputted signal data.

9. A format conversion method as defined in claim 8 wherein said selection step comprises:
a threshold judgment step of comparing the count value with a second threshold value;
a delaying step of delaying the input signal by an interval of pixels that are adjacent to each other in the horizontal direction; and
a switching step of selecting either the input signal or the signal delayed in the delaying step, on the basis of the result of judgment in the threshold judgment step.

10. A format conversion method as defined in claim 8 wherein said selection step comprises:
a threshold judgment step of comparing the count value with a second threshold value;
a delaying step of delaying the input signal by an interval of lines that are adjacent to each other in the vertical direction; and
a switching step of selecting either the input signal or the signal delayed in the delaying step, on the basis of the result of judgment in the threshold judgment step.

11. A format conversion method as defined in claim 8 further including:

a singular point detection step of detecting a singular point of the input signal data, at which a difference between the input signal data and signal data nearest to the input signal data is equal to or larger than a third threshold value; and said selection step selecting the signal data at the singular point, when either of the two pieces of input signal data existing before and after the timing generated in the timing generation step corresponds to the singular point of the input signal data.

12. A format conversion method as defined in claim 11 wherein said singular point detection step comprises:

a delaying step of delaying an input signal by an interval of pixels that are adjacent to each other in the horizontal direction;

a difference detection step of detecting a difference between the input signal and the signal delayed in the delaying step; and a detection step of detecting the input signal data as a singular point of input signal data when the result of detection in the difference detection step is equal to or larger than the third threshold value.

13. A format conversion method as defined in claim 11 wherein said singular point detection step comprises:

a delaying step of delaying the input signal by an interval of lines that are adjacent to each other in the vertical direction;

a difference detection step of detecting a difference between the input signal and the signal delayed in the delaying step; and a detection step of detecting the input signal data as a singular point of the input signal data when the result of detection in the difference detection step is equal to or larger than the third threshold value.

14. A format conversion method for subjecting data having a predetermined resolution to conversion of the resolution according to a resolution of a display screen, said method comprising:

a horizontal direction timing generation step of generating a horizontal direction thinning-out timing for thinning out input signal data using a resolution conversion coefficient that is calculated on the basis of a conversion ratio of resolution in the horizontal direction;

a horizontal direction selection step of selecting, from two pieces of pixel data existing before and after the horizontal thinning-out timing generated in the horizontal direction timing generation step, the pixel data that is timewise closer to the horizontal thinning-out timing;

a vertical direction timing generation step of generating a vertical direction thinning-out timing for thinning out input signal data using a resolution conversion coefficient that is calculated on the basis of a conversion ratio of resolution in the vertical direction; and a vertical direction selection step of selecting, from two pieces of line data existing before and after the vertical thinning-out timing generated in the vertical direction timing generation step, the line data that is timewise closer to the vertical thinning-out timing;

wherein at least one of said horizontal direction timing generation step and said vertical direction timing generation step comprises performing, with a counter unit, a counting process of cumulatively counting the resolution conversion coefficient for every sampling clock of the input signal, with a first threshold value as a limit, and setting a value obtained by removing a carryout signal from the count value as a count value for the next sampling clock, when the count value overflows; and outputting a timing of the sampling clock at which the count value of the counter unit becomes equal to or larger than the first threshold value, as a thinning-out timing for thinning out the inputted signal data.

* * * * *

UNITED STATES PATENT AND TRADEMARK OFFICE
CERTIFICATE OF CORRECTION

PATENT NO.       : 7,649,567 B2
APPLICATION NO. : 11/289598
DATED            : January 19, 2010
INVENTOR(S)      : Satoru Tanigawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this

Twenty-eighth Day of December, 2010

David J. Kappos
*Director of the United States Patent and Trademark Office*